United States Patent
Kang et al.

(10) Patent No.: US 9,831,932 B2
(45) Date of Patent: Nov. 28, 2017

(54) METHOD FOR TRANSMITTING FEEDBACK INFORMATION THROUGH TERMINAL TO FOR SPLIT BEAMFORMING IN WIRELESS COMMUNICATION SYSTEM AND APPARATUS THEREFOR

(71) Applicant: LG ELECTRONICS INC., Seoul (KR)

(72) Inventors: Jiwon Kang, Seoul (KR); Kilbom Lee, Seoul (KR); Hyunsoo Ko, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 126 days.

(21) Appl. No.: 14/888,383

(22) PCT Filed: Apr. 30, 2014

(86) PCT No.: PCT/KR2014/003853
§ 371 (c)(1),
(2) Date: Oct. 30, 2015

(87) PCT Pub. No.: WO2014/178648
PCT Pub. Date: Nov. 6, 2014

(65) Prior Publication Data
US 2016/0080058 A1  Mar. 17, 2016

Related U.S. Application Data

(60) Provisional application No. 61/818,434, filed on May 1, 2013.

(51) Int. Cl.
*H04W 72/04* (2009.01)
*H04L 5/00* (2006.01)
*H04B 7/06* (2006.01)

(52) U.S. Cl.
CPC ........... *H04B 7/0617* (2013.01); *H04B 7/063* (2013.01); *H04B 7/0689* (2013.01); *H04B 7/0691* (2013.01); *H04L 5/0048* (2013.01)

(58) Field of Classification Search
CPC .. H04B 7/0456; H04B 7/0617; H04B 7/0632; H04B 7/0417; H04B 7/0413; H04B 7/0619
(Continued)

(56) References Cited

U.S. PATENT DOCUMENTS

2005/0042988 A1* 2/2005 Hoek ................... H04B 7/0634
 455/69
2011/0216846 A1 9/2011 Lee et al.
(Continued)

FOREIGN PATENT DOCUMENTS

KR 10-2009-0018518 2/2009
KR 10-2010-0124267 11/2010
(Continued)

OTHER PUBLICATIONS

PCT International Application No. PCT/KR2014/003853, Written Opinion of the International Searching Authority dated Aug. 21, 2014, 15 pages.
(Continued)

*Primary Examiner* — Charles C Jiang
*Assistant Examiner* — Will Lin
(74) *Attorney, Agent, or Firm* — Lee Hong Degerman Kang & Waimey

(57) ABSTRACT

Disclosed is a method for transmitting, by a terminal, feedback information to a network for partial beamforming based on a multi-antenna in a wireless communication system. Specifically, the method comprises: a step of receiving, from the network, reference signals corresponding to antenna sections included in the multi-antenna; a step of
(Continued)

selecting one or more beamforming mode among beamforming modes included in a candidate beamforming mode set on the basis of the reference signals, and forming feedback information related to the selected one or more beamforming modes; and a step of transmitting the feedback information to the network, and the feedback information includes a pre-coding matrix index corresponding to at least one of the antenna sections and connection coefficient information for connecting the antenna sections.

10 Claims, 17 Drawing Sheets

(58) Field of Classification Search
  USPC .................................................. 370/329, 252
  See application file for complete search history.

(56) References Cited

U.S. PATENT DOCUMENTS

| | | | | |
|---|---|---|---|---|
| 2013/0196675 | A1* | 8/2013 | Xiao | H04W 72/082 455/452.1 |
| 2013/0258964 | A1* | 10/2013 | Nam | H04W 72/046 370/329 |
| 2014/0064109 | A1* | 3/2014 | Krishnamurthy | H04J 11/0053 370/252 |
| 2014/0112173 | A1* | 4/2014 | Hammarwall | H04L 1/0026 370/252 |
| 2014/0177745 | A1* | 6/2014 | Krishnamurthy | H04B 7/0413 375/267 |

FOREIGN PATENT DOCUMENTS

| | | |
|---|---|---|
| KR | 10-2011-0034317 | 4/2011 |
| KR | 10-2012-0082315 | 7/2012 |
| WO | 2008117984 | 10/2008 |
| WO | 2010050874 | 5/2010 |
| WO | 2011/044668 | 4/2011 |
| WO | 2014052806 | 4/2014 |
| WO | 2014168319 | 10/2014 |

OTHER PUBLICATIONS

European Patent Office Application Serial No. 14792032.6, Search Report dated Nov. 30, 2016, 9 pages.

* cited by examiner (A) CONTROL-PLANE PROTOCOL STACK (B) USER-PLANE PROTOCOL STACK (a) CONVENTIONAL ANTENNA SYSTEM        (b) AAS CSI-RS resource 1 for Partition 1

CSI-RS resource 2 for linking coeff

CSI-RS resource 1 for Partition 1 & Linking coeff

CSI-RS resource 2 for linking coeff

METHOD FOR TRANSMITTING FEEDBACK INFORMATION THROUGH TERMINAL TO FOR SPLIT BEAMFORMING IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2014/003853, filed on Apr. 30, 2014, which claims the benefit of U.S. Provisional Application No. 61/818,434, filed on May 1, 2013, the contents of which are all hereby incorporated by reference herein in their entirety.

TECHNICAL FIELD

The present invention relates to a wireless communication system and, more particularly, to a method and apparatus for transmitting feedback information at a user equipment (UE) for fractional beamforming in a wireless communication system.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the problem lies in a method and apparatus for transmitting feedback information at a user equipment (UE) for fractional beamforming in a wireless communication system.

Technical Solution

The object of the present invention can be achieved by providing a method of transmitting feedback information from a user equipment (UE) to a network for fractional beamforming based on multiples antennas in a wireless communication system including receiving reference signals corresponding to antenna partitions included in the multiple antennas from the network, selecting one or more beamforming modes from among beamforming modes included in a candidate beamforming mode set and configuring the feedback information related to the selected one or more beamforming modes, based on the reference signals, and transmitting the feedback information to the network, wherein the feedback information includes a precoding matrix index corresponding to at least one of the antenna partitions and linking coefficient information for linking the antenna partitions.

The method may further include receiving information on the beamforming modes included in the candidate beamforming mode set from the network. When a plurality of beamforming modes is selected by the UE, the network may select and apply one of the plurality of beamforming modes and transmit a signal to the UE.

In another aspect of the present invention, provided herein is a method of, at a network, receiving feedback information from a user equipment (UE) for fractional beamforming based on multiple antennas in a wireless communication system including transmitting reference signals corresponding to antenna partitions included in the multiple antennas to the UE, and receiving the feedback information based on the reference signals from the UE, wherein the feedback information relates to one or more beamforming modes selected by the UE from among the beamforming modes included in a candidate beamforming mode set and includes a precoding matrix index corresponding to at least one of the antenna partitions and linking coefficient information for linking the antenna partitions.

The method may further include transmitting information on the beamforming modes included in the candidate beamforming mode set to the UE. The method may further include, when a plurality of beamforming modes is selected by the UE, the network selecting and applying one of the plurality of beamforming modes and transmitting a signal to the UE.

According to the present invention, the feedback information may include channel quality information and rank indicators of the beamforming modes included in the candidate beamforming mode set. When the antenna partitions are in a perfectly aligned state, the feedback information may include one precoding matrix for the antenna partitions and the linking coefficient information.

The candidate beamforming mode set may include at least one of an open-loop beamforming mode, a closed-loop beamforming mode, a vertical beamforming mode and a horizontal beamforming mode.

Advantageous Effects

According to embodiments of the present invention, it is possible to efficiently report feedback information for fractional beamforming in a wireless communication system.

It will be appreciated by persons skilled in the art that the effects that can be achieved through the present invention are not limited to what has been particularly described hereinabove and other advantages of the present invention will be more clearly understood from the following detailed description.

BEST MODE

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
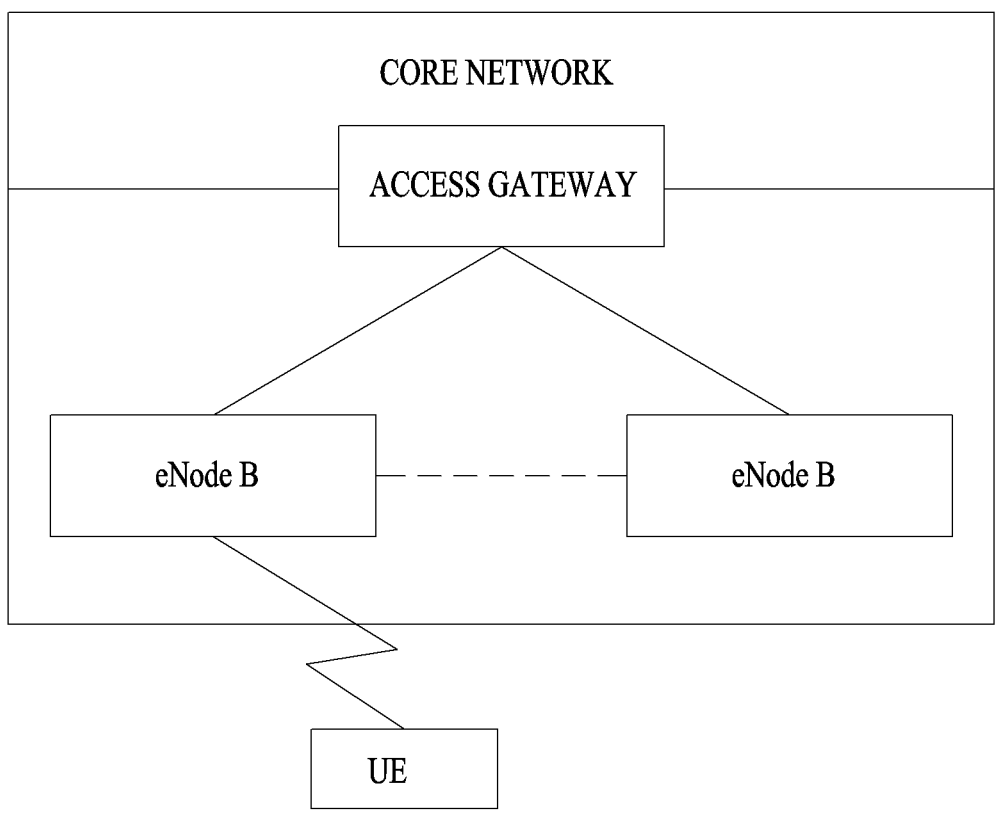
FIG. 1 illustrates a configuration of an Evolved Universal Mobile Telecommunications System (E-UMTS) network as an example of a wireless communication system.
Figure 2:
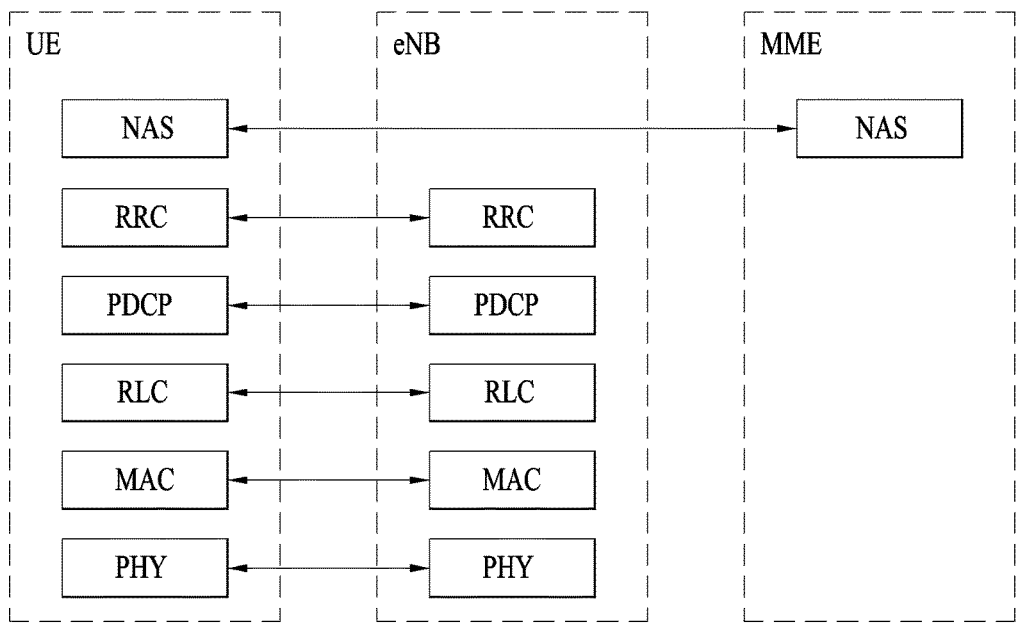
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN)
Figure 2:
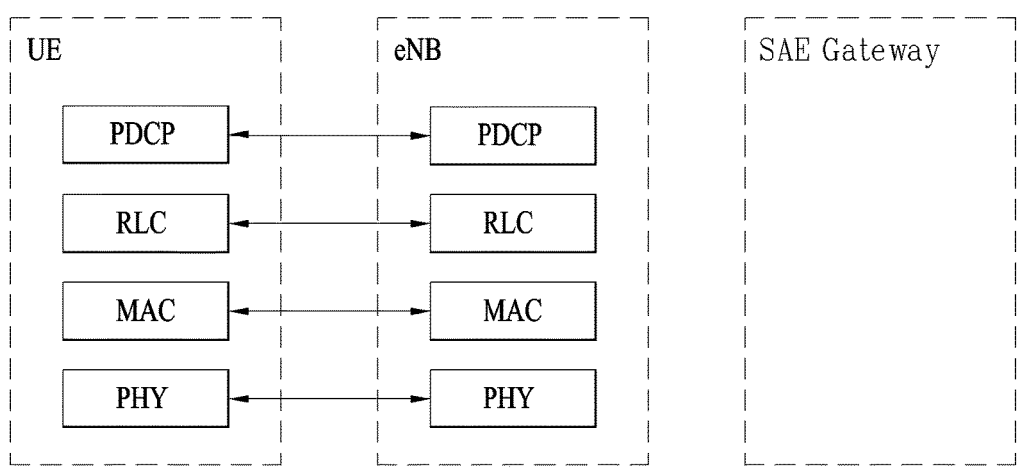

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
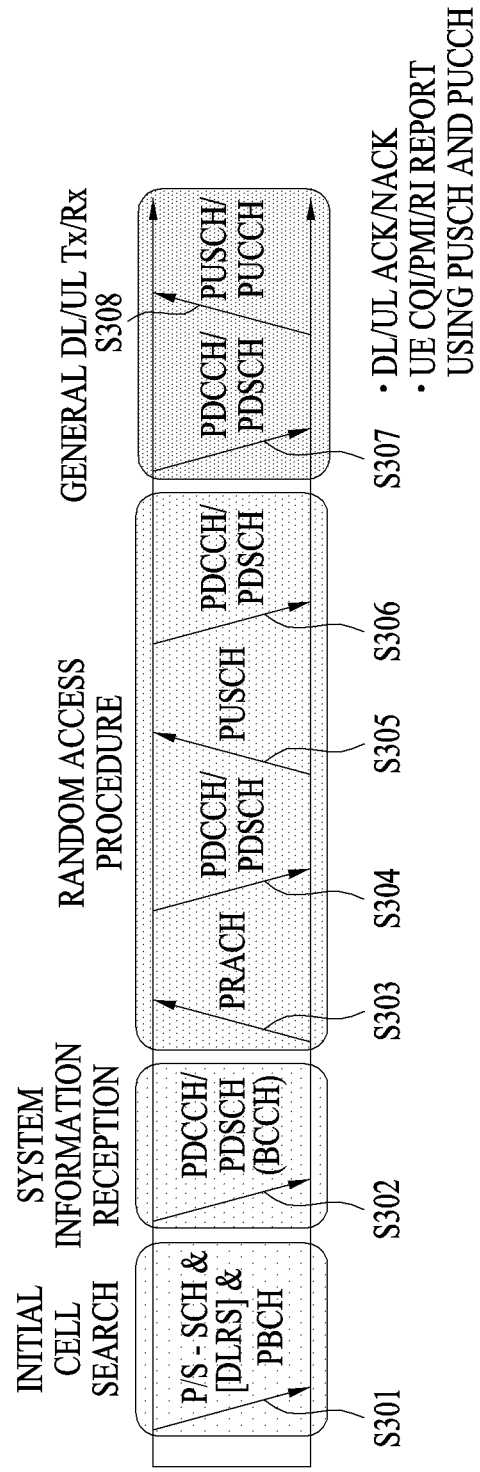
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
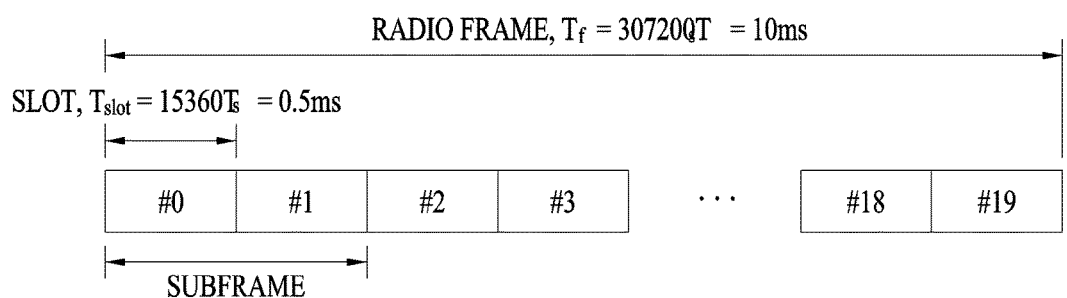
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15\ \text{kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
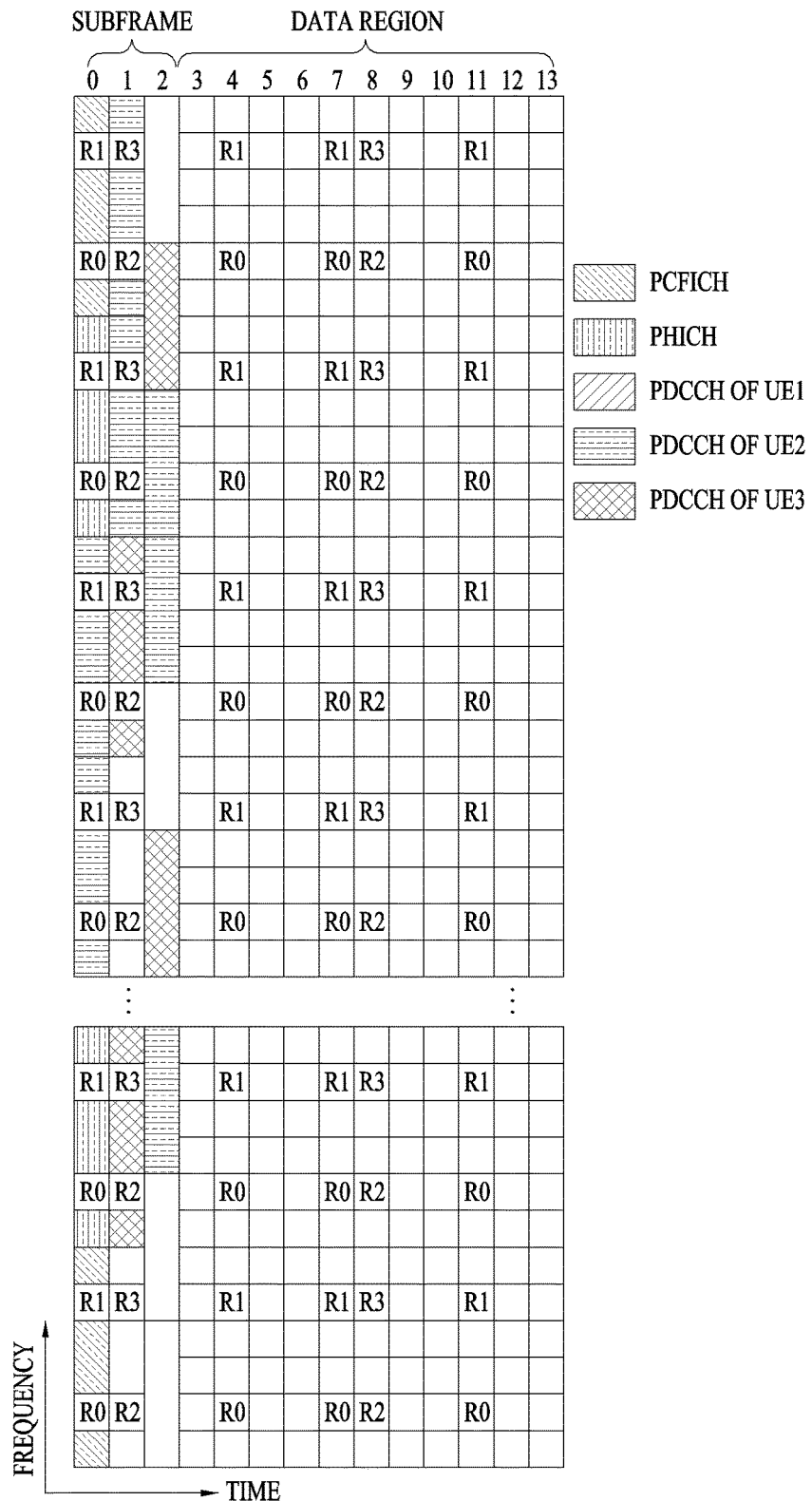
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
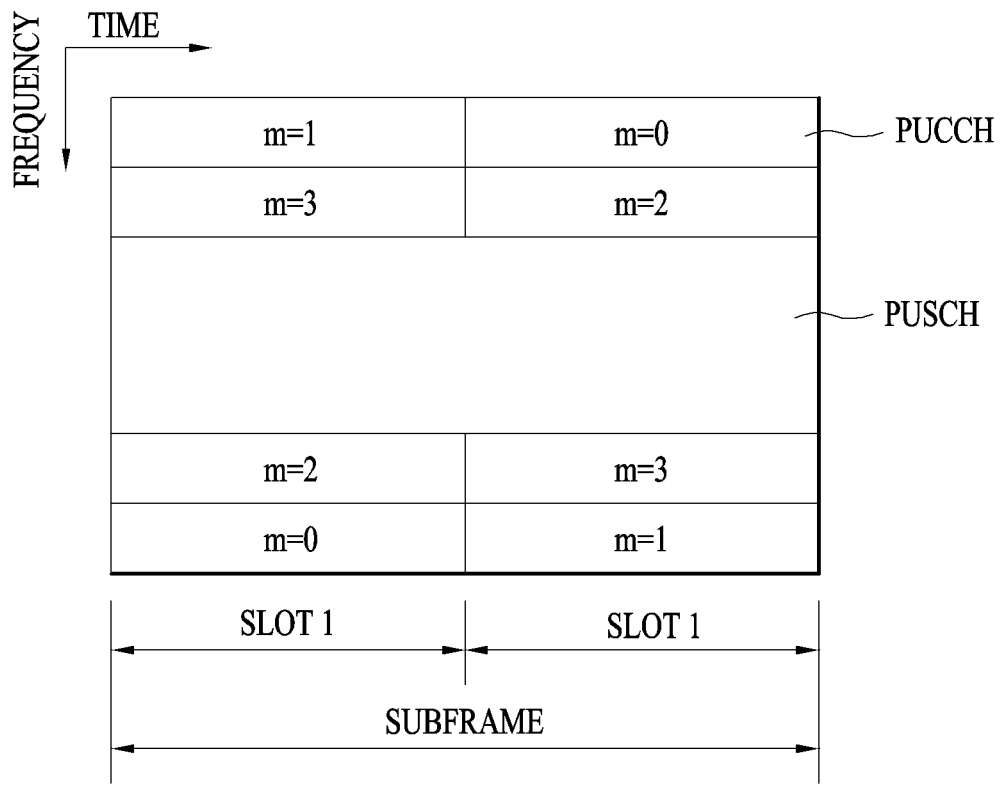
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Now a description will be given of a MIMO system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term "MIMO" is interchangeable with 'multi-antenna'.

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
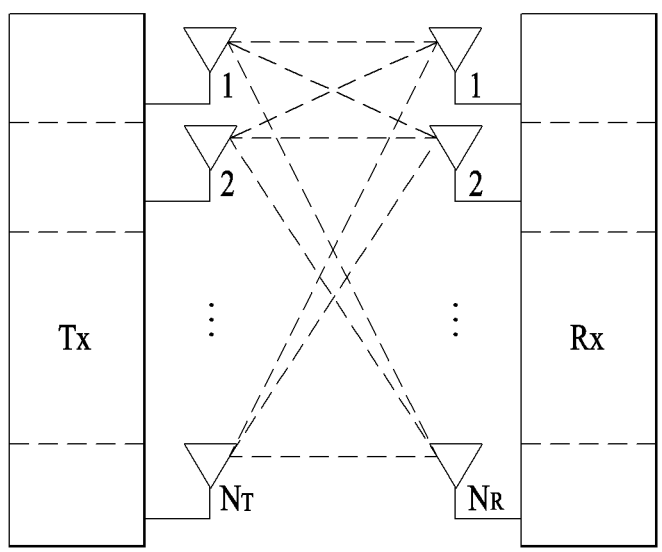
FIG. 7 illustrates a configuration of a general Multiple Input Multiple Output (MIMO) communication system.

FIG. 7 illustrates the configuration of a typical MIMO communication system.

Referring to FIG. 7, a transmitter has $N_T$ Tx antennas and a receiver has $N_R$ Rx antennas. The use of a plurality of antennas at both the transmitter and the receiver increases a theoretical channel transmission capacity, compared to the use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards such as standards for 3G mobile communications, future-generation Wireless Local Area Network (WLAN), etc.

Concerning the research trend of MIMO up to now, active studies are underway in many aspects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 7 will be described in detail through mathematical modeling. Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector ŝ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by [Equation 5].

Herein, $w_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

It is expected that the future-generation mobile communication standard, LTE-A will support Coordinated Multi-Point (CoMP) transmission in order to increase data rate, compared to the legacy LTE standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In DL CoMP-JP, a UE may instantaneously receive data simultaneously from eNBs that perform CoMP transmission and may combine the received signals, thereby increasing reception performance (Joint Transmission (JT)). In addition, one of the eNBs participating in the CoMP transmission may transmit data to the UE at a specific time point (Dynamic Point Selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (Joint Reception (JR)). In contrast, in UL CoMP-CS/CB, only one eNB receives a PUSCH from a UE. Herein, cooperative cells (or eNBs) may make a decision as to whether to use CoMP-CS/CB.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1 W2) \quad \text{[Equation 8]}$$

In Equation 8, W2 is a short-term PMI, which is a codeword of a codebook reflecting short-term channel information, W is a codeword of a final codebook, and norm (A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \quad \text{[Equation 9]}$$

-continued where $X_i$ is $Nt/2$ by $M$ matrix.

$$W2(j) = \begin{bmatrix} e_M^k & e_M^l & e_M^m \\ & \cdots & \\ \alpha_j e_M^k & \beta_j e_M^l & \gamma_j e_M^m \end{bmatrix} \text{(if rank} = r\text{),}$$

where $1 \leq k, l, m \leq M$ and $k, l, m$ are integer.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i) * W2(j) = \begin{bmatrix} X_i(k) \\ \alpha_j X_i(k) \end{bmatrix}$$ [Equation 10]

In Equation 10, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback. The CSI feedback is transmitted on a PUCCH or a PUSCH to an eNB.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 8:
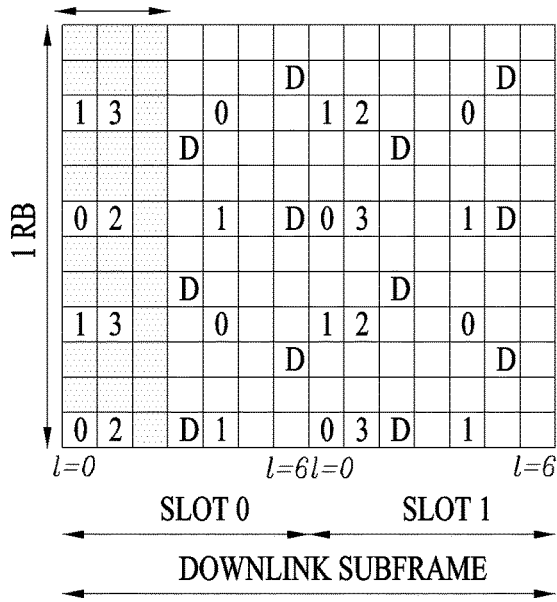
FIGS. 8 and 9 illustrate downlink Reference Signal (RS) configurations in an LTE system supporting downlink transmission through four antennas (4-Tx downlink transmission)
Figure 9:
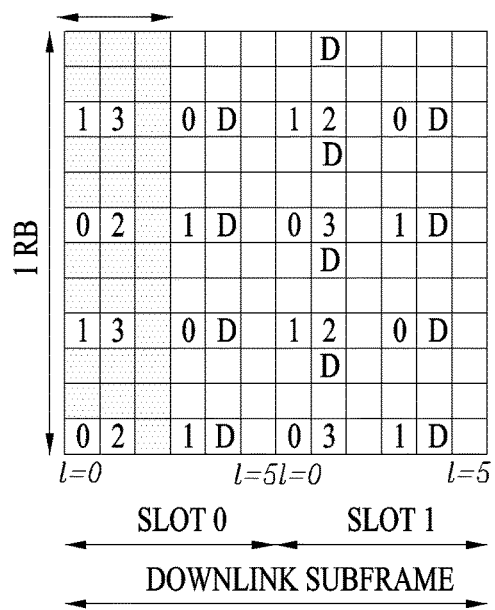

FIGS. 8 and 9 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 8 and 9, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 8 and 9, the DMRSs are transmitted through antenna port 5. 3GPP TS 36.211 defines DMRSs for a total of eight antenna ports, antenna port 7 to antenna port 14.

Figure 10:
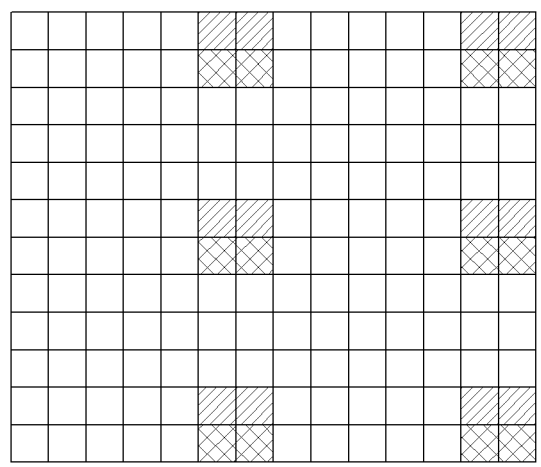
FIG. 10 illustrates an exemplary downlink Demodulation Reference Signal (DMRS) allocation defined in a current 3GPP standard specification.

FIG. 10 illustrates an exemplary DL DMRS allocation defined in a current 3GPP standard specification.

Referring to FIG. 10, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 1] and [Table 2] list CSI-RS configurations defined in the 3GPP standard. Specifically, [Table 1] lists CSI-RS configurations in the case of a normal CP and [Table 2] lists CSI-RS configurations in the case of an extended CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
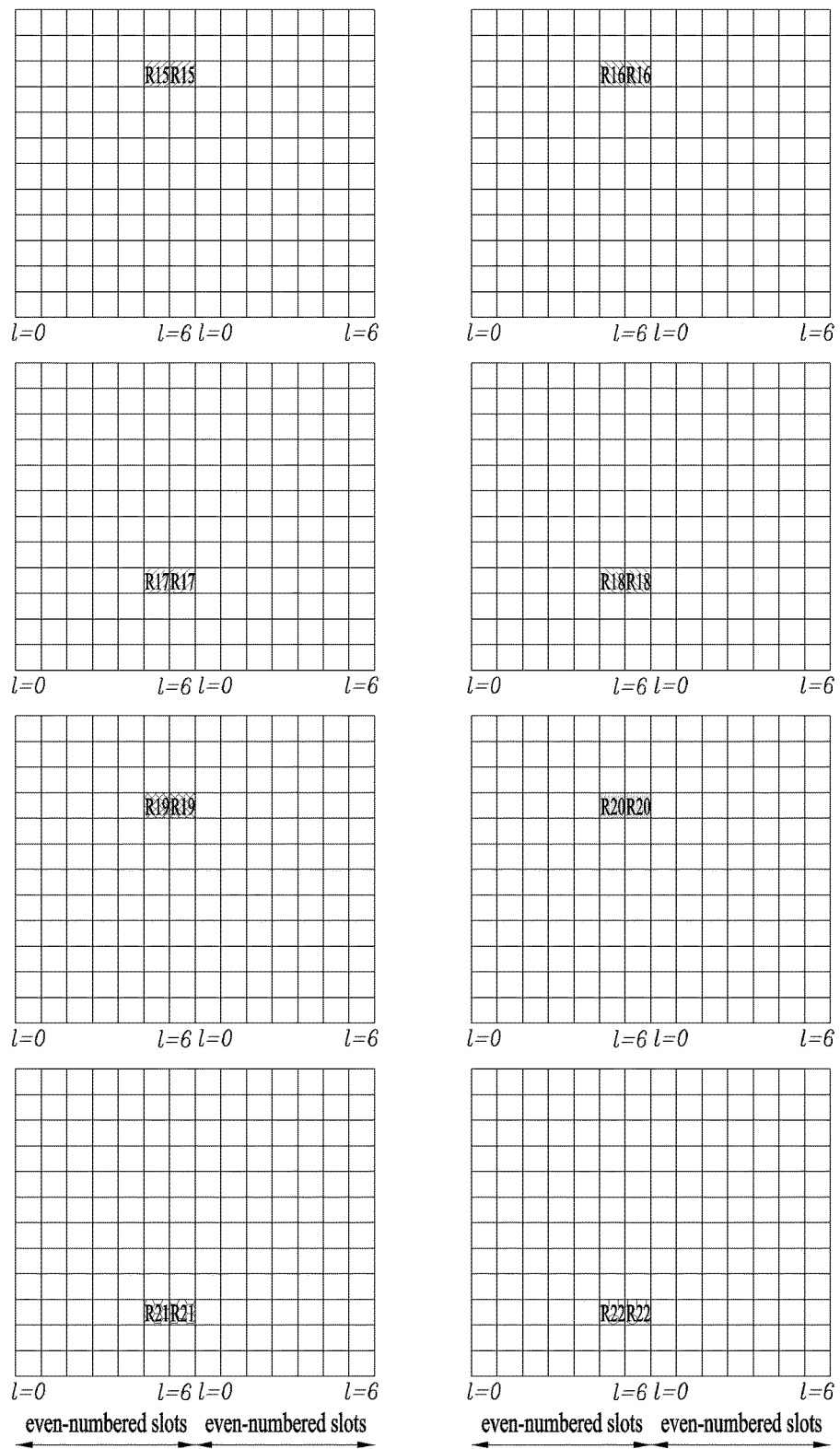
FIG. 11 illustrates Channel State Information-Reference Signal (CSI-RS) configuration #0 of downlink CSI-RS configurations defined in a current 3GPP standard specification.

In [Table 1] and [Table 2], (k', l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$. [Table 3] lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Information about a Zero Power (ZP) CSI-RS is transmitted in a CSI-RS-Config-r10 message configured as illustrated in [Table 4] by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 3]. zeroTxPowerResourceConfigList-r10 indicates a ZP CSI-RS configuration. The elements of this bitmap indicate the respective configurations written in the columns for four CSI-RS antenna ports in [Table 1] or [Table 2]. That is, the current 3GPP standard defines a ZP CSI-RS only for four CSI-RS antenna ports.

TABLE 4

```
-- ASN1START
CSI-RS -Config -r10 ::=    SEQUENCE {
    csi-RS-r10              CHOICE {
        ...
    }
    zeroTxPowerCSI-RS-r10   CHOICE {
        release                 NULL,
        setup                   SEQUENCE {
            zeroTxPowerResourceConfigList-r10 BIT STRING (SIZE (16)),
            zeroTxPowerSubframeConfig-r10     INTEGER (0..154)
        }
    }
}
-- ASN1STOP
```

The current 3GPP standard defines modulation orders and cording rates for respective CQI indexes as illustrated in [Table 5].

TABLE 5

| CQI index | modulation | code rate × 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |

TABLE 5-continued

| CQI index | modulation | code rate × 1024 | efficiency |
|---|---|---|---|
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A CQI is calculated based on interference measurement as follows.

A UE needs to measure a Signal to Interference and Noise Ratio (SINR) for CQI calculation. In this case, the UE may measure the reception power (S-measure) of a desired signal in an RS such as a Non-Zero Power (NZP) CSI-RS. For interference power measurement (I-measure or Interference Measurement (IM)), the UE measures the power of an interference signal resulting from eliminating the desired signal from a received signal.

CSI measurement subframe sets $C_{CSI,0}$ and $C_{CSI,1}$ may be configured by higher-layer signaling and the subframes of each subframe set are different from the subframes of the other subframe set. In this case, the UE may perform S-measure in an RS such as a CSI-RS without any specific subframe constraint. However, the UE should calculate CQIs separately for the CSI measurement subframe sets $C_{CSI,0}$ and $C_{CSI,1}$ through separate I-measures in the CSI measurement subframe sets $C_{CSI,0}$ and $C_{CSI,1}$.

Hereinbelow, transmission modes for a DL data channel will be described.

A current 3GPP LTE standard specification, 3GPP TS 36.213 defines DL data channel transmission modes as illustrated in [Table 6] and [Table 7]. A DL data channel transmission mode is indicated to a UE by higher-layer signaling, that is, RRC signaling.

TABLE 6

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Large delay CDD or Transmit diversity |
| Mode 4 | DCI format 1A | Transmit diversity |
| | DCI format 2 | Closed-loop spatial multiplexing or Transmit diversity |
| Mode 5 | DCI format 1A | Transmit diversity |
| | DCI format 1D | Multi-user MIMO |
| Mode 6 | DCI format 1A | Transmit diversity |
| | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
| | DCI format 1 | Single-antenna port, port 5 |
| Mode 8 | DCI format 1A | If the number of PBCH antenna ports is one, Single-antenna port, port 0 is used, otherwise Transmit diversity |
| | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2C | Up to 8 layer transmission, ports 7-14 or single-antenna port, port 7 or 8 |

TABLE 6-continued

| Transmission mode | DCI format | Transmission scheme of PDSCH corresponding to PDCCH |
|---|---|---|
| Mode 10 | DCI format 1A | Non-MBSFN subframe: If the number of PBCH antenna ports is one, Single-antenna port, port 0 is used, otherwise Transmit diversity<br>MBSFN subframe: Single-antenna port, port 7 |
| | DCI format 2D | Up to 8 layer transmission, ports 7-14 or single-antenna port, port 7 or 8 |

TABLE 7

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Transmit diversity |
| Mode 4 | DCI format 1A | Transmit diversity |
| | DCI format 2 | Transmit diversity |
| Mode 5 | DCI format 1A | Transmit diversity |
| Mode 6 | DCI format 1A | Transmit diversity |
| Mode 7 | DCI format 1A | Single-antenna port, port 5 |
| | DCI format 1 | Single-antenna port, port 5 |
| Mode 8 | DCI format 1A | Single-antenna port, port 7 |
| | DCI format 2B | Single-antenna port, port 7 or 8 |
| Mode 9 | DCI format 1A | Single-antenna port, port 7 |
| | DCI format 2C | Single-antenna port, port 7 or 8, |
| Mode 10 | DCI format 1A | Single-antenna port, port 7 |
| | DCI format 2D | Single-antenna port, port 7 or 8, |

Referring to [Table 6] and [Table 7], the 3GPP LTE standard specification defines DCI formats according to the types of RNTIs by which a PDCCH is masked. Particularly for C-RNTI and SPS C-RNTI, the 3GPP LTE standard specification defines transmission modes and DCI formats corresponding to the transmission modes, that is, transmission mode-based DCI formats as illustrated in [Table 6] and [Table 7]. DCI format 1A is additionally defined for application irrespective of transmission modes, that is, for a fall-back mode. [Table 6] illustrates transmission modes for a case where a PDCCH is masked by a C-RNTI and [Table 7] illustrates transmission modes for a case where a PDCCH is masked by an SPS C-RNTI.

Referring to [Table 6], if a UE detects DCI format 1B by blind-decoding a PDCCH masked by a C-RNTI, the UE decodes a PDSCH, assuming that the PDSCH has been transmitted in a single layer by closed-loop spatial multiplexing.

In [Table 6] and [Table 7], Mode 10 is a DL data channel transmission mode for CoMP. For example, in [Table 6], if the UE detects DCI format 2D by blind-decoding a PDCCH masked by a C-RNTI, the UE decodes a PDSCH, assuming that the PDSCH has been transmitted through antenna port 7 to antenna port 14, that is, based on DM-RSs by a multi-layer transmission scheme, or assuming that the PDSCH has been transmitted through a single antenna port, DM-RS antenna port 7 or 8.

On the other hand, if DCI format 1A is detected as a result of blind-decoding the PDCCH, a transmission mode differs according to whether an associated subframe is an MBSFN subframe. For example, the associated subframe is a non-MBSFN subframe, the UE decodes the PDSCH assuming that the PDSCH has been transmitted by a single-antenna transmission scheme based on CRS of antenna port 0 or by a CRS based transmit diversity scheme. If the associated subframe is an MBSFN subframe, the UE decodes the PDSCH assuming that the PDSCH has been transmitted by a single-antenna transmission scheme based on DM-RS of antenna port 7.

Now a description will be given of Quasi Co-Location (QCL).

If one antenna port is quasi co-located with another antenna port, this means that a UE may assume that the large-scale properties of a signal received from one of the antenna ports (or a radio channel corresponding to the antenna port) are wholly or partially identical to those of a signal received from the other antenna port (or a radio channel corresponding to the antenna port). The large-scale properties may include Doppler spread, Doppler shift, timing offset-related average delay, delay spread, average gain, etc.

According to the definition of QCL, the UE may not assume that antenna ports that are not quasi co-located with each other have the same large-scaled properties. Therefore, the UE should perform a tracking procedure independently for the respective antenna ports in order to the frequency offsets and timing offsets of the antenna ports.

On the other hand, the UE may performing the following operations regarding quasi co-located antenna ports.

1) The UE may apply the estimates of a radio channel corresponding to a specific antenna port in power-delay profile, delay spread, Doppler spectrum, and Doppler spread to Wiener filter parameters used in channel estimation of a radio channel corresponding another antenna port quasi co-located with the specific antenna port.

2) The UE may acquire time synchronization and frequency synchronization of the specific antenna port to the quasi co-located antenna port.

3) Finally, the UE may calculate the average of Reference Signal Received Power (RSRP) measurements of the quasi co-located antenna ports to be an average gain.

For example, it is assumed that upon receipt of DM-RS-based DL data channel scheduling information, for example, DCI format 2C on a PDCCH (or an Enhanced PDCCH (E-PDCCH)), the UE performs channel estimation on a PDSCH using a DM-RS sequence indicated by the scheduling information and then demodulates data.

In this case, if an antenna port configured for a DM-RS used in DL data channel estimation is quasi co-located with an antenna port for an antenna port configured for a CRS of a serving cell, the UE may use estimated large-scale properties of a radio channel corresponding to the CRS antenna port in channel estimation of a radio channel corresponding to the DM-RS antenna port, thereby increasing the reception performance of the DM-RS-based DL data channel.

Likewise, if the DM-RS antenna port for DL data channel estimation is quasi co-located with the CSI-RS antenna port of the serving cell, the UE may use estimated large-scale properties of the radio channel corresponding to the CSI-RS antenna port in channel estimation of the radio channel corresponding to the DM-RS antenna port, thereby increasing the reception performance of the DM-RS-based DL data channel.

In LTE, it is regulated that when a DL signal is transmitted in Mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with respect to large-scale properties except average gain. This means that the same node transmits a physical channel and signals. On the other hand, QCL type B is defined such that up to four QCL modes are configured for each UE by a higher-layer message to enable CoMP transmission such as DPS or JT and a QCL mode to be used for DL signal transmission is indicated to the UE dynamically by DCI.

DPS transmission in the case of QCL type B will be described in greater detail.

If node #1 having N1 antenna ports transmits CSI-RS resource #1 and node #2 having N2 antenna ports transmits CSI-RS resource #2, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within the common overage of node #1 and node #2 by a higher-layer signal.

Then, the eNB may perform DPS by configuring QCL mode parameter set #1 for the UE when transmitting data (i.e. a PDSCH) to the UE through node #1 and QCL mode parameter set #2 for the UE when transmitting data to the UE through node #2 by DCI. If QCL mode parameter set #1 is configured for the UE, the UE may assume that CSI-RS resource #1 is quasi co-located with a DM-RS and if QCL mode parameter set #2 is configured for the UE, the UE may assume that CSI-RS resource #2 is quasi co-located with the DM-RS.

An Active Antenna System (AAS) and Three-Dimensional (3D) beamforming will be described below.

In a legacy cellular system, an eNB reduces ICI and increases the throughput of UEs within a cell, for example, SINRs at the UEs by mechanical tilting or electrical tilting, which will be described below in greater detail.

Figure 12:
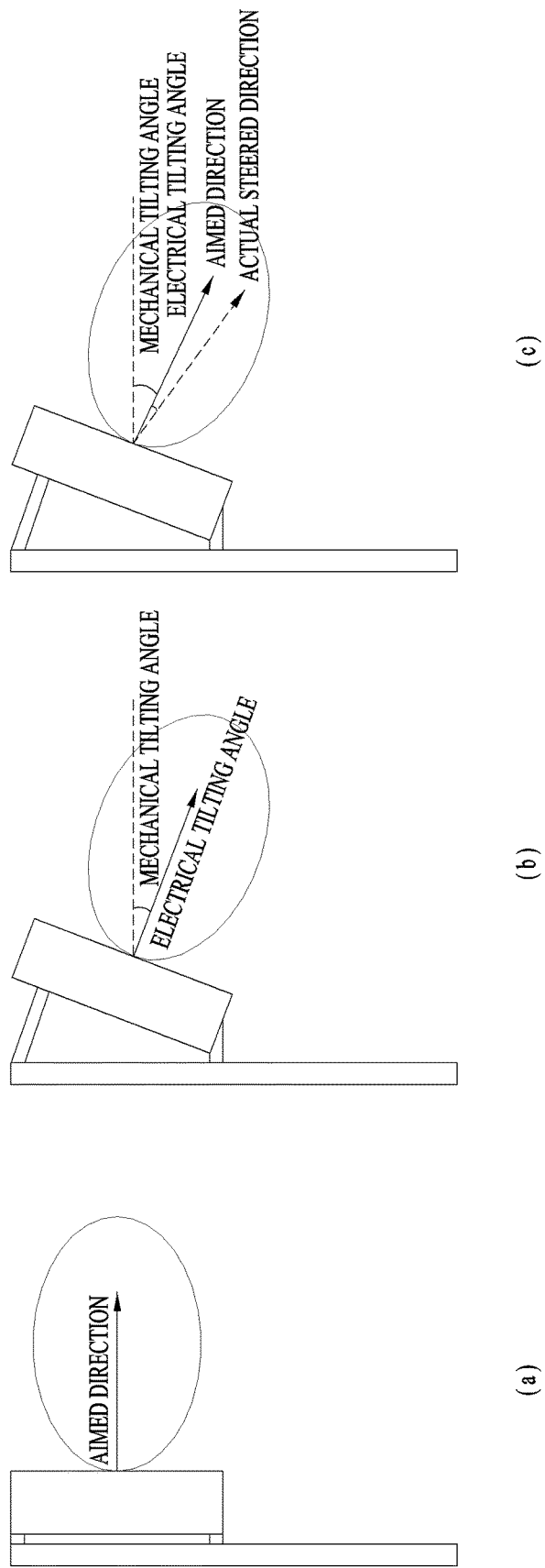
FIG. 12 illustrates antenna tilting schemes.

FIG. 12 illustrates antenna tilting schemes. Specifically, FIG. 12(a) illustrates an antenna configuration to which antenna tilting is not applied, FIG. 12(b) illustrates an antenna configuration to which mechanical tilting is applied, and FIG. 12(c) illustrates an antenna configuration to which both mechanical tilting and electrical titling are applied.

A comparison between FIGS. 12(a) and 12(b) reveals that mechanical tilting suffers from a fixed beam direction at initial antenna installation as illustrated in FIG. 12(b). On the other hand, electrical tilting allows only a very restrictive vertical beamforming due to cell-fixed tilting, despite the advantage of a tilting angle changeable through an internal phase shifter as illustrated in FIG. 12(c).

Figure 13:
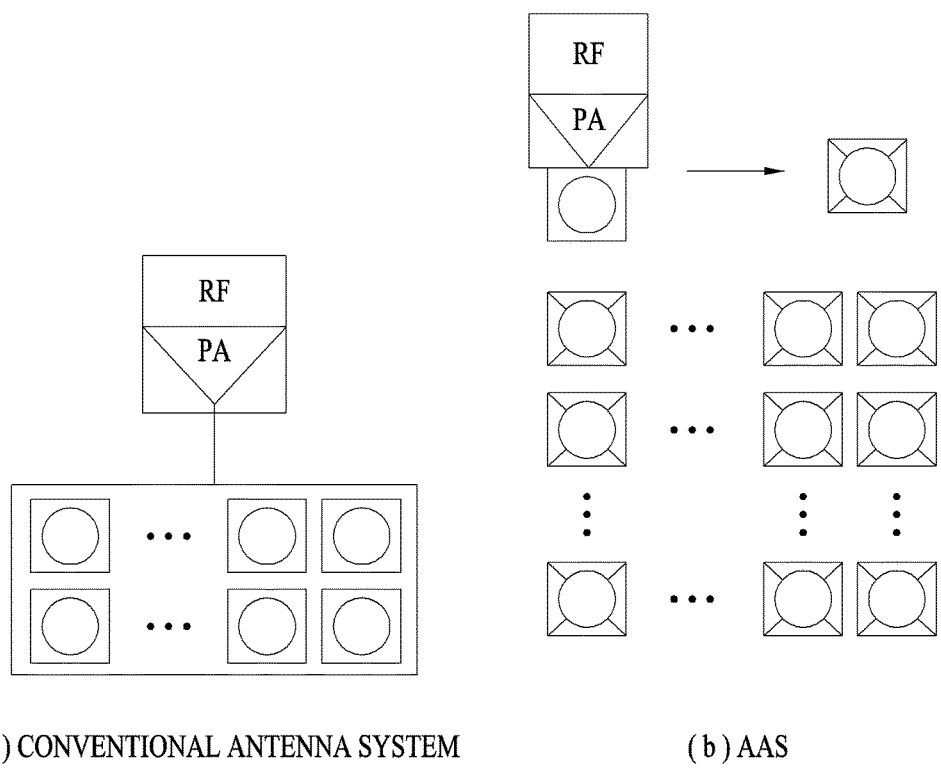
FIG. 13 is a view comparing an antenna system of the related art with an Active Antenna System (AAS)

FIG. 13 is a view comparing an antenna system of the related art with an AAS. Specifically, FIG. 13(a) illustrates the antenna system of the related art and FIG. 13(b) illustrates the AAS.

Referring to FIG. 13, as compared to the antenna system of the related art, each of a plurality of antenna modules includes a Radio Frequency (RF) module such as a Power Amplifier (PA), that is, an active device in the AAS. Thus, the AAS may control the power and phase on an antenna module basis.

In general, a linear array antenna (i.e. a one-dimensional array antenna) such as a ULA is considered as a MIMO antenna structure. A beam that may be formed by the one-dimensional array antenna exists on a Two-Dimensional (2D) plane. The same thing applies to a Passive Antenna System (PAS)-based MIMO structure. Although a PAS-based eNB has vertical antennas and horizontal antennas, the vertical antennas may not form a beam in a vertical direction and may allow only the afore-described mechanical tilting because the vertical antennas are in one RF module.

However, as the antenna structure of an eNB has evolved to an AAS, RF modules are configured independently even for vertical antennas. Consequently, vertical beamforming as well as horizontal beamforming is possible. This is called elevation beamforming.

The elevation beamforming may also be referred to as 3D beamforming in that available beams may be formed in a 3D space along the vertical and horizontal directions. That is, the evolution of a one-dimensional array antenna structure to a 2D array antenna structure enables 3D beamforming 3D beamforming is not possible only when an antenna array is planar. Rather, 3D beamforming is possible even in a ring-shaped 3D array structure. A feature of 3D beamforming lies in that a MIMO process takes place in a 3D space in view of various antenna layouts other than existing one-dimensional antenna structures.

Figure 14:
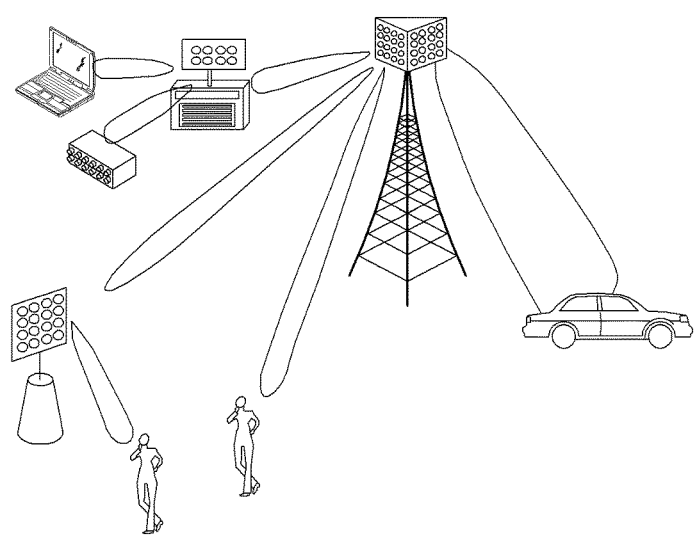
FIG. 14 illustrates an exemplary AAS-based User Equipment (UE)-specific beamforming.

FIG. 14 illustrates an exemplary UE-specific beamforming in an AAS. Referring to FIG. 14, even though a UE moves forward or backward from an eNB as well as to the left and right of the eNB, a beam may be formed toward the UE by 3D beamforming Therefore, higher freedom is given to UE-specific beamforming.

Further, an outdoor to outdoor environment where an outdoor eNB transmits a signal to an outdoor UE, an Outdoor to Indoor (O2I) environment where an outdoor eNB transmits a signal to an indoor UE, and an indoor to indoor environment (an indoor hotspot) where an indoor eNB transmits a signal to an indoor UE may be considered as transmission environments using an AAS-based 2D array antenna structure.

Figure 15:
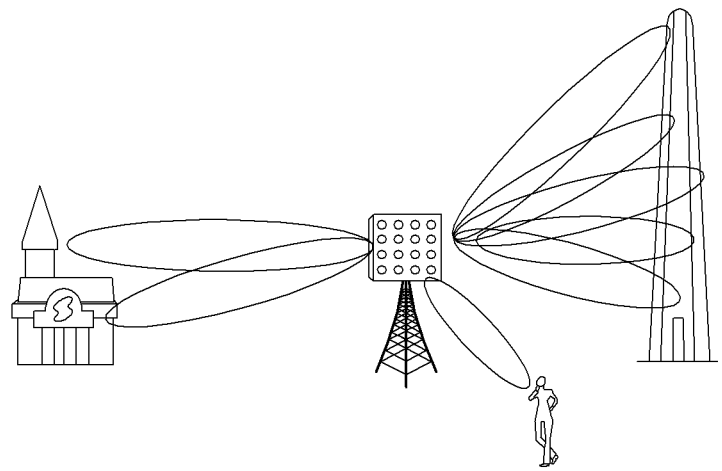
FIG. 15 illustrates an AAS-based two-dimensional beam transmission scenario.

FIG. 15 illustrates an AAS-based 2D beam transmission scenario.

Referring to FIG. 15, an eNB needs to consider vertical beam steering based on various UE heights in relation to building heights as well as UE-specific horizontal beam steering in a real cell environment where there are multiple buildings in a cell. Considering this cell environment, very different channel characteristics from those of an existing wireless channel environment, for example, shadowing/path loss changes according to different heights, varying fading characteristics, etc. need to be reflected.

In other words, 3D beamforming is an evolution of horizontal-only beamforming based on an existing linear one-dimensional array antenna structure. 3D beamforming refers to a MIMO processing scheme performed by extending to or combining with elevation beamforming or vertical beamforming using a multi-dimensional array antenna structure such as a planar array.

Now a description will be given of a MIMO system using linear precoding. A DL MIMO system may be modeled as [Equation 11] in frequency units (e.g. a subcarriers) that are assumed to experience flat fading in the frequency domain in a narrow band system or a wideband system.

$$y = Hx + z \qquad \text{[Equation 11]}$$

If the number of Rx antenna ports at a UE is $N_r$ and the number of Tx antenna ports at an eNB is $N_t$, y is an $N_r \times 1$ signal vector received at the $N_r$ Rx antennas of the UE, H is a MIMO channel matrix of size $N_r \times N_t$, x is $N_t \times 1$ transmission signals, and z is an $N_r \times 1$ received noise and interference vector in [Equation 11].

The above system model is applicable to a multi-user MIMO scenario as well as a single-user MIMO scenario. While $N_r$ is the number of Rx antennas at the single UE in the single-user MIMO scenario, $N_r$ may be interpreted as the total number of Rx antennas at multiple UEs in the multi-user MIMO scenario.

The above system model is applicable to a UL transmission scenario as well as a DL transmission scenario. Then, $N_t$ may represent the number of Tx antennas at the UE and $N_r$ may represent the number of Rx antennas at the eNB.

In the case of a linear MIMO precoder, the MIMO precoder may be generally represented as a matrix U of size $N_t \times N_s$ where $N_s$ is a transmission rank or the number of transmission layers. Accordingly, the transmission signal vector x may be modeled as [Equation 12].

$$x = \sqrt{\frac{P_T}{N_s}} Us \qquad \text{[Equation 12]}$$

where $P_T$ is transmission signal energy and s is an $N_s \times 1$ transmission signal vector representing signals transmitted in $N_s$ transmission layers. That is, $E\{s^H U^H Us\}=N_s$. Let $N_t \times 1$ precoding vectors corresponding to the $N_s$ transmission layers be denoted by $u_1, \ldots, u_{Ns}$. Then, $U=[u_1 \ldots u_{Ns}]$. In this case, [Equation 12] may be expressed as [Equation 13].

$$x = \sqrt{\frac{P_T}{N_s}} \sum_{i=1}^{N_s} u_i s_i \qquad \text{[Equation 13]}$$

where $s_i$ is an ith element of the vector s. Generally, it may be assumed that signals transmitted in different layers are uncorrelated ($E\{S^*_j s_i\}=0 \forall i \neq j$) and the average magnitude of each signal is the same. If it is assumed that the average energy of each signal is 1 ($E\{|s_i|^2\}=1 \forall i$) and the average for the convenience of description, the sum of the energy of the layer precoding vectors is $N_s$ given as [Equation 14].

$$\sum_{i=1}^{N_s} E\{u_i^H u_i\} = N_s \qquad \text{[Equation 14]}$$

If a signal is to be transmitted with the same power in each layer, it is noted from [Equation 14] that $E\{u_i^H u_i\}=1$.

As a future multi-antenna system such as massive MIMO or large-scale MIMO evolves, the number of antennas will increase gradually. In fact, use of up to 64 Tx antennas is considered for an eNB in the LTE standard, taking into account a 3D MIMO environment.

However, as the number of antennas increases, pilot overhead and feedback overhead also increase. As a result, decoding complexity may be increased. Since the size of the MIMO channel matrix H increases with the number of antennas at an eNB, the eNB should transmit more measurement pilots to a UE so that the UE may estimate the MIMO channels. If the UE feeds back explicit or implicit information about the measured MIMO channels to the eNB, the amount of feedback information will increase as the channel matrix gets larger. Particularly when a codebook-based PMI feedback is transmitted as in the LTE system, the increase of antennas in number leads to an exponential increase in the size of a PMI codebook. Consequently, the computation complexity of the eNB and the UE is increased.

In this environment, system complexity and overhead may be mitigated by partitioning total Tx antennas and thus transmitting a pilot signal or a feedback on a sub-array basis. Especially from the perspective of the LTE standard, a large-scale MIMO system may be supported by reusing most of the conventional pilot signal, MIMO precoding scheme, and/or feedback scheme that support up to 8 Tx antennas.

From this viewpoint, if each layer precoding vector of the above MIMO system model is partitioned into M sub-precoding vectors and the sub-precoding vectors of a precoding vector for an ith layer are denoted by $u_{i,1}, \ldots, u_{i,M}$, the precoding vector for the ith layer may be represented as $u_i=[u_{i,1}^T u_{i,2}^T \ldots u_{i,M}^T]^T$.

Each sub-precoding vector experiences, as effective channels, a sub-channel matrix including Tx antennas in a partition corresponding to the sub-precoding vector, obtained by dividing the $N_r \times N_t$ MIMO channel matrix H by rows. The MIMO channel matrix H is expressed using the sub-channel matrices, as follows.

$$H=[H_1 \ldots H_M] \qquad \text{[Equation 15]}$$

If the UE determines each preferred sub-precoding vector based on a PMI codebook, an operation for normalizing each sub-precoding vector is needed. Normalization refers to an overall operation for processing the value, size, and/or phase of a pre-coding vector or a specific element of the precoding vector in such a manner that sub-precoding vectors of the same size may be selected from a PMI codebook for the same number of Tx antennas.

For example, if the first element of the PMI codebook is 0 or 1, the phase and size of each sub-precoding vector may be normalized with respect to 0 or 1. Hereinbelow, it is assumed that a sub-precoding vector $u_{i,m}$ for an m th partition is normalized with respect to a value of $\alpha_{i,m}$ and the normalized sub-precoding vector or the Normalized Partitioned Precoder (NPP) is $v_{i,m}=u_{i,m}/\alpha_{i,m}$. Therefore, partitioned precoding is modeled as [Equation 16], in consideration of codebook-based precoding.

$$u_i=[\alpha_{i,1}v_{i,1}^T \alpha_{i,2}v_{i,2}^T \ldots \alpha_{i,M}v_{i,M}^T]^T \qquad \text{[Equation 16]}$$

As noted from [Equation 16], the values of $\alpha_{i,m}$ may be interpreted as values that link the NPPs to each other from the perspective of the whole precoder. Hereinafter, these values will be referred to as linking coefficients. Thus, a precoding method for the total Tx antennas (antenna ports) may be defined by defining NPPs for the partitions of antenna ports and linking coefficients that link the NPPs to one another.

M linking coefficients for the ith layer may be defined as a vector $a_i=[\alpha_{i,1} \alpha_{i,2} \ldots \alpha_{i,M}]^T$. Herein, $a_i$ will be referred to as a 'linking vector'.

While it may be said that the linking vector is composed of M values, the other (M−1) values $b_i$ normalized with respect to the first element of the linking vector may be regarded as the linking vector. That is, the relative differences of the other (M−1) NPPs with respect to the first NPP may be defined as a linking vector as expressed in [Equation 17]. This is because it is assumed in many cases that the first element is already normalized from the perspective of the whole precoding vector $u_i$.

$$\frac{a_i}{\alpha_{i,1}} = \left[1 \frac{\alpha_{i,2}}{\alpha_{i,1}} \frac{\alpha_{i,3}}{\alpha_{i,1}} \ldots \frac{\alpha_{i,M}}{\alpha_{i,1}}\right]^T = [1 b_i^T]^T \qquad \text{[Equation 17]}$$

If each of the transmission layers is divided into the same number of partitions, a linking matrix expressed as [Equation 18] may also be defined. An NPP for each partition in the form of a matrix may be defined as [Equation 19].

$$A=[a_1 \ldots a_{N_s}] \quad \text{[Equation 18]}$$

$$V_m=[v_{1,m} \ldots v_{N_s,m}], m=1, \ldots M \quad \text{[Equation 19]}$$

Let a vector obtained by repeating each element of an M×1 linking vector as many times as the size of each partition be denoted by an extended linking vector $\hat{a}_i$. For example, if M=2 and the sizes of the first and second partitions are 3 and 4, respectively for an ith layer, $\hat{a}=[\alpha_{i,1}\alpha_{i,1}\alpha_{i,1}\alpha_{i,2}\alpha_{i,2}\alpha_{i,2}\alpha_{i,2}]^T$. An extended linking matrix $\hat{A}=[\hat{a}_1 \ldots \hat{a}_{N_s}]$ may be defined by stacking the extended linking vectors.

In this case, the whole precoding matrix may be expressed as a Hadamard product (or element-wise product) between the extended linking matrix and the NPP matrix $V_t$ in [Equation 20].

$$U=\hat{A} \circ V_t \quad \text{[Equation 20]}$$

where $V_t=[V_1^T \ldots V_M^T]^T$ and the matrix operator ∘ represents the Hadamard product.

The (extended) linking vectors and the (extended) linking matrix are collectively called a linking precoder. The term precoder is used herein because the (extended) linking vectors and the (extended) linking matrix are elements determining the Tx antenna precoder. As noted from [Equation 20], one linking precoder may be configured, which should not be construed as limiting the present invention. For example, a plurality of sub-linking vectors may be configured by additional partitioning of the linking vector $a_i$ and sub-linking precoders may be defined accordingly. While the following description is given in the context of a single linking precoder, a linking precoder partitioning scenario is not excluded.

While the linking coefficients are represented in such a manner that different linking coefficients are applicable to different transmission layers in the same partition, if each layer is partitioned in the same manner, the linking coefficients may be configured independently of the transmission layers. That is, the same linking coefficients may be configured for every layer. In this case, the relationship that $a\square a_1 = \ldots = a_{N_s}$ is established between the linking vectors. Then the linking precoder may be expressed only with M or (M−1) linking coefficients.

MIMO precoding schemes may be categorized largely into closed-loop precoding and open-loop precoding. When a MIMO precoder is configured, channels between a transmitter and a receiver are considered in the closed-loop precoding scheme. Therefore, additional overhead such as transmission of a feedback signal from a UE or transmission of a pilot signal is required so that the transmitter may estimate MIMO channels. If the channels are accurately estimated, the closed-loop precoding scheme outperforms the open-loop precoding scheme. Thus, the closed-loop precoding scheme is used mainly in a static environment experiencing little channel change between a transmitter and a receiver (e.g. an environment with a low Doppler spread and a low delay spread) because the closed-loop precoding scheme requires channel estimation accuracy. On the other hand, the open-loop precoding scheme outperforms the closed-loop precoding scheme in an environment experiencing a great channel change between a transmitter and a receiver because there is no correlation between the channel change between the transmitter and the receiver and a MIMO precoding scheme.

To apply closed-loop precoding to a massive MIMO environment having a large number of antennas, information about each sub-precoder and information about a linking precoder are required. Without codebook-based feedback, the linking precoder information may not be needed. Depending on a partitioning method, effective channels experienced by each sub-precoder may have different characteristics from effective channels experienced by the linking precoder.

For example, one sub-precoder may experience MIMO channels having a relatively low Doppler spread, whereas another sub-precoder may experience MIMO channels having a relatively high Doppler spread. In another example, while all sub-precoders may experience effective channels having similar Doppler characteristics, the linking precoder may experience effective channels having different Doppler characteristics.

Hereinafter, a fractional beamforming scheme for adaptively optimizing a MIMO transmission scheme according to partitioned channels and linking channels in the partitioned precoding environment will be described.

<Fractional Beamforming>

An eNB may perform closed-loop precoding with respect to some of precoders for antenna port partitions and linking precoders for linking antenna port partitions and apply one of the following precoding schemes to the other precoders.

1. A precoding scheme defined in a system (hereinafter, default precoding)

2. A precoding scheme pre-designated by an eNB or a network (hereinafter, reference precoding)

3. A precoding scheme randomly set by an eNB (hereinafter, random precoding)

Hereinafter, a set of partitions and/or linking coefficients, to which closed-loop precoding is applied, is referred to as a control space and a set of partitions and/or linking coefficients, to which closed-loop precoding is not applied, is referred to as a non-control space.

The default precoding scheme which is defined in the system refers to a method of defining and using a beam transmitted to the non-control space in the system. Default precoding may be defined to follow an arbitrary open-loop precoding scheme. Default precoding may be differently configured according to system bandwidth, the number of transmit antennas of an eNB, the number of transmission layers (or transmission rank), transmit antenna configurations $N_{t\_v}$ and $N_{t\_h}$ of an eNB or the number of transmit antennas of a non-control direction. Alternatively, a specific beam may be configured regardless of the system parameters. In addition, default precoding may be fixed over the entire frequency band and time or may be changed in specific time or frequency resource units.

In addition, the reference precoding scheme which is pre-designated by the eNB or the network refers to a method of designating a precoding scheme to be applied to the non-control space with respect to a UE in the eNB or the network. Accordingly, reference precoding information of the non-control space is delivered to the UE via a physical layer or higher layer message. The reference precoding information means all information explicitly or implicitly indicating a MIMO precoder to be applied to the non-control space. For example, a specific index (PMI) of a PMI codebook corresponding to the number of transmit antennas in the non-control space, a quantized value of each element of a MIMO precoding matrix of the non-control space, an index to be used for transmission after indexing a plurality of MIMO precoding schemes may be signaled as reference precoding information.

In addition, reference precoding may change in specific time or frequency resource units. In this case, after a plurality of change patterns is defined according to time/frequency resources of reference precoding, a reference precoding pattern index used in the eNB or the network may be signaled as reference precoding information. Alternatively, the seed value of a random number generator for deriving a change pattern according to time/frequency resources may also be used as reference precoding information. Alternatively, information as to which of various precoding schemes (e.g., STBC, delay diversity, etc.) is used may be used as reference precoding information.

Further, a random precoding scheme which is randomly set by the eNB means a method of arbitrarily determining and applying a precoding scheme to be applied to the non-control space at the eNB. Accordingly, unlike the default precoding scheme or the reference precoding scheme, the UE does not know the precoder to be applied to the non-control space. For example, the eNB may transmit a beam randomly changed in specific time resource units (e.g., OFDM symbols) and/or frequency resource units (e.g., subcarriers) to the non-control space.

In the above-described fractional beamforming schemes, independent partitioning and fractional beamforming schemes are applicable according to transmission layers. Alternatively, the same partitioning and fractional beamforming scheme is applicable to all transmission layers.

The above-described fractional beamforming scheme is suitable for a channel environment in which reliability of feedback information of some transmit antennas or feedback information of linking coefficients decreases or feedback is unnecessary. In particular, when reliability of feedback information of some of transmit antennas or feedback information of linking coefficients decreases, unnecessary packet reception errors and retransmission due to feedback information errors may be prevented and, when feedback is unnecessary, feedback overhead may be minimized.

<Aligned Partitioned Precoding>

If some or all antenna port partitions have the same size and partitioned antenna arrays have similar efficient channel properties, the same precoding scheme, that is, aligned partitioned precoding, is applicable to the NPPs.

Figure 16:
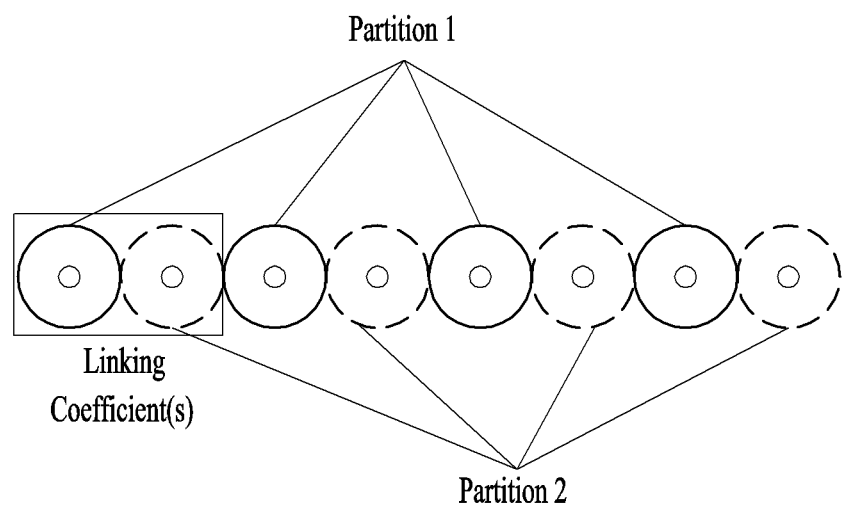
FIG. 16 illustrates an example of applying aligned partitioned precoding in a uniform linear array.

FIG. 16 illustrates an example of applying aligned partitioned precoding in a uniform linear array.

Referring to FIG. 16, in the uniform linear array (ULA) composed of eight antennas, a first partition is composed of first, third, fifth and seventh antennas and a second partition is composed of second, fourth, sixth and eighth antennas. If a gap between antennas is narrow and few scatterers are present, the first partition and the second partition are likely to experience similar MIMO channels except for a phase difference between the two partitions corresponding to a linking precoder component. In this case, the same precoding scheme is configured to be applied to the two partitions.

Figure 17:
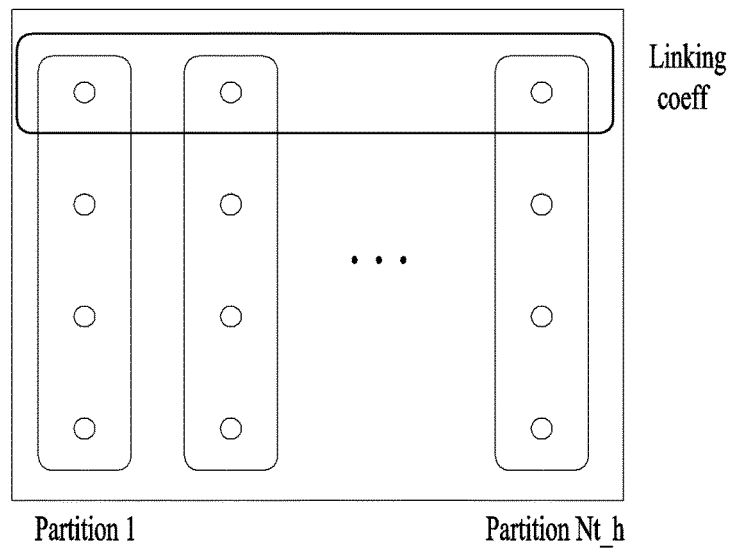
FIG. 17 illustrates an example of applying column based aligned partitioned precoding in a square array.

FIG. 17 illustrates an example of applying column based aligned partitioned precoding in a square array.

Referring to FIG. 17, in a square array composed of $N_t(=N_{t\_v} \times N_{t\_h})$ antennas including $N_{t\_v}$ rows and $N_{t\_h}$ columns, each column is configured as one partition. In an environment in which a distance between columns is close and $N_{t\_h}$ is not large, the same precoding scheme may be configured to be applied to all partitions. A linking vector is configured independently of a sub-precoder.

Figure 18:
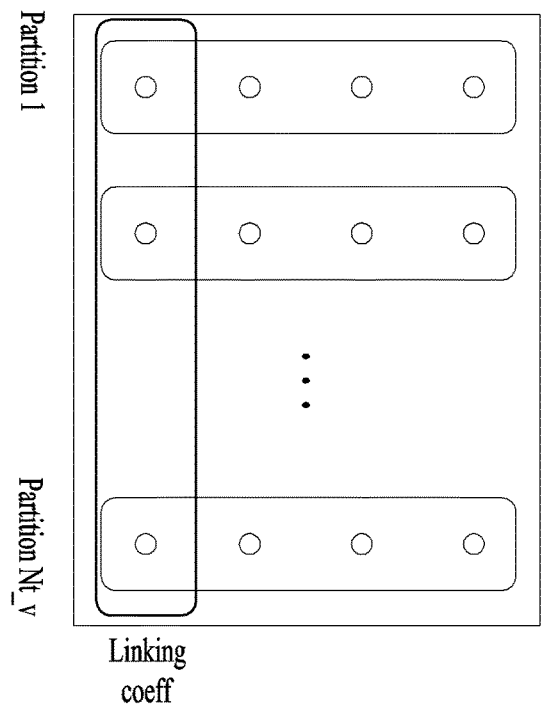
FIG. 18 illustrates an example of applying row based aligned partitioned precoding in a square array.

FIG. 18 illustrates an example of applying row based aligned partitioned precoding in a square array.

Referring to FIG. 18, in a square array composed of $N_t(=N_{t\_v} \times N_{t\_h})$ antennas including $N_{t\_v}$ rows and $N_{t\_h}$ columns, each row is configured as one partition. In an environment in which a distance between rows is close and $N_{t\_v}$ is not large, the same precoding scheme may be configured to be applied to all partitions. A linking vector is set independently of a sub-precoder.

Figure 19:
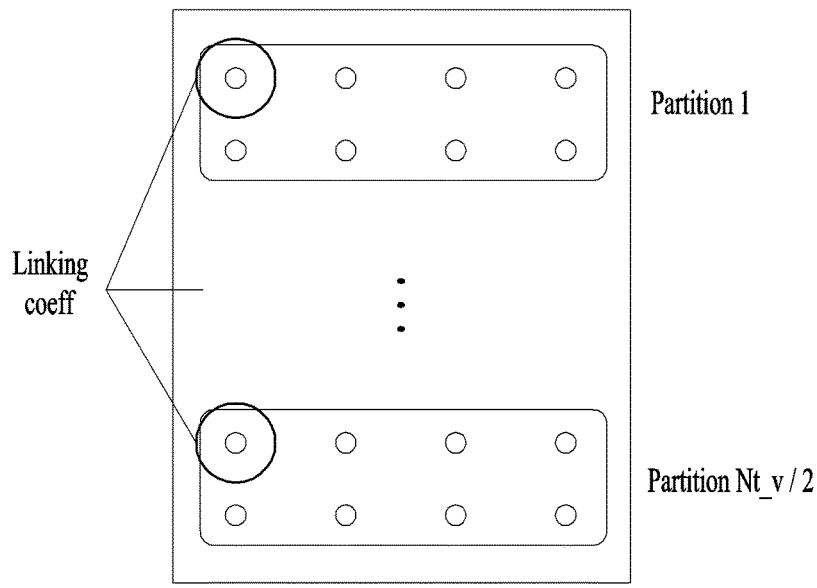
FIG. 19 illustrates an example of applying row group based aligned partitioned precoding in a square array.

FIG. 19 illustrates an example of applying row group based aligned partitioned precoding in a square array.

Referring to FIG. 19, in a square array composed of $N_t(=N_{t\_v} \times N_{t\_h})$ antennas including $N_{t\_v}$ rows and $N_{t\_h}$ columns, a row group composed of N rows is configured as one partition. In an environment in which a distance between rows is close and $N_{t\_v}$ is not large, the same precoding scheme may be configured to be applied to all partitions. A linking vector is configured independently of a sub-precoder.

As in the examples of FIGS. 16 to 19, if the sizes of all partitions are the same and the same precoder is applied to all partitions (that is $v_i \square v_{i,1} = \ldots = v_{i,M}$), the precoder of an i-th layer may be expressed by a Kronecker product of a linking precoder and a sub-precoder as shown in the following equation.

$$u_i = [\alpha_{i,1} v_{i,1}^T \alpha_{i,2} v_{i,2}^T \ldots \alpha_{i,M} v_{i,M}^T]^T = [\alpha_{i,1} v_i^T \alpha_{i,2} v_i^T \ldots \alpha_{i,M} v_i^T]^T = a_i \otimes v_i \qquad \text{[Equation 21]}$$

In addition, if the same partitioning is performed with respect to all transmission layers, the MIMO precoder of all the layers may be expressed by a Khatri-Rao product (column-wise Kronecker product) of a sub-precoding matrix $V = [v_1 \ldots v_{N_s}]$ having a size of $$\frac{N_t}{M} \times N_s$$

and a linking matrix A having a size of $M \times N_s$ as shown in Equation 22 below.

$$U = [a_1 \otimes v_1 \ldots a_{N_s} \otimes v_{N_s}] = A * V \qquad \text{[Equation 22]}$$

In addition, as shown in FIG. 17, in a two-dimensional antenna port array environment, when each column is configured as a partition, the sub-precoder $v_i$ or V performs vertical beamforming (or elevation beamforming) and the linking precoder $a_i$ or A performs horizontal beamforming (or azimuth beamforming). Similarly, as shown in FIG. 18, in a two-dimensional antenna port array environment, when each row is configured as a partition, the sub-precoder $v_i$ or V performs horizontal beamforming and the linking precoder $a_i$ or A performs vertical beamforming.

As a result, as in the example of FIG. 17 or 18, in the two-dimensional (2D) antenna (port) array environment, when perfectly aligned partitioned precoding is performed in a row or column direction, the precoder for performing three-dimensional (3D) beamforming may be expressed by one sub-precoder and one linking precoder and one of the two precoders performs vertical beamforming and the other predecoder performs horizontal beamforming.

When fractional beamforming proposed in the environment in which the perfectly aligned partitioned precoding is performed is applied, in the environment in which the precoding schemes applied to all partitions are coincident, the eNB performs closed-loop precoding with respect to any one of the sub-precoder and the linking precoder and applies one of default precoding, reference precoding and random precoding to the other precoder.

As shown in FIGS. 17 and 18, 3D beamforming is suitable for the 2D antenna array environment. 3D beamforming and, more particularly, UE-specific 3D beamforming can optimize performance in a fading environment in a 3D space and the vertical/horizontal position of the UE. However, accurate channel information (CSI) between the eNB and the UE is required in order to appropriately perform UE-specific 3D beamforming using the closed-loop precoding scheme.

Accordingly, since a difference between a minimum value and a maximum value of performance according to the MIMO transmission method increases by increase in the number of eNB antennas and the beamforming order, performance sensitivity due to eNB CSI estimation error factors such as channel estimation error, feedback error and channel aging further increases. When CSI estimation error of the eNB is not severe, normal transmission may be performed by channel coding. However, when error is severe, packet reception error may occur and thus packet retransmission may be performed. That is, performance may extremely deteriorate.

For example, when 3D beamforming is performed with respect to a UE which rapidly moves in a horizontal direction of the eNB, packet retransmission is highly likely to be performed. Although an open-loop precoding scheme is conventionally performed with respect to this UE, this UE experiences a static channel in a vertical direction and thus vertical beamforming is advantageously performed. Horizontal beamforming is advantageously performed with respect to a UE which rapidly moves in a vertical direction or a UE in an environment in which scattering is severe in a vertical direction. In addition with respect to a UE located in a high and narrow building, 3D beamforming is performed and a horizontal beamforming direction may be fixed to a specific direction by the eNB. That is, the UE may be prompted to configure feedback information only for vertical beamforming and feedback overhead may be reduced.

Accordingly, when fractional beamforming is applied to a 3D beamforming environment, 2D beamforming (vertical beamforming or horizontal beamforming) may be performed according to user environments. Therefore, this may be referred to as partial dimensional beamforming. For example, an eNB having a 2D transmit antenna port may perform closed-loop precoding with respect to any one of a vertical precoder and a horizontal precoder and apply one of default precoding, reference precoding and random precoding to the other predecoder.

In the above-described partitioned precoding scheme, the sub-precoder and the linking precoder are defined from the viewpoint of data transmission of the eNB. From the viewpoint of the UE, in association with the sub-precoder and the linking precoder, to which the closed-loop method is applied, a preferred precoding index (PPI) may be transmitted to the eNB. As a representative PPI, there is a PMI feedback method of feeding back a preferred index after indexing matrix precoders.

When some feedback information is partitioned in units composed of partitions and/or values for linking partitions, pilot signals transmitted from the eNB to the UE may be linked with a specific set of antenna ports. Such a set of pilot signals is referred to as a pilot pattern. As a representative pilot pattern, there is a non-zero-power (NZP) CSI-RS resource (or process) which is a measurement pilot used in an LTE system. For example, the following mapping relationship between partition, CSI-RS and PMI feedback may be defined.

A. Aligned Unit of Partition, Pilot Pattern and PMI Feedback 1. (Partition) In a system composed of 16 antenna ports, the eNB configures two partitions each including eight antenna ports and performs partitioned precoding.
2. (Pilot pattern) In order to support partitioned precoding, the eNB allocates and transmits 8tx NZP CSI-RS resources to each partition, that is, configures two co-located NZP CSI-RS resources with respect to the UE.
3. (PMI feedback) The UE feeds back PMI1, PMI2 and linking coefficient values for linking PMI1 and PMI2 (e.g., PMI3 of the linking precoder) of the two antenna port partitions.

That is, when a separate NP CSI-RS resource is allocated to each antenna port partition, the eNB may configure a plurality of NZP CSI-RS resources to the UE with respect to a plurality of co-located (or synchronized) antenna port partitions belonging to one eNB (or transmission point). At this time, in order to distinguish between a non-co-located antenna port pattern used for CoMP transmission and the co-located antenna port patterns, the eNB may inform the UE of co-location between NZP CSI-RS resources. For example, the eNB may inform the UE of a quasi-co-location (QCL) condition among a plurality of NZP CSI-RS resources.

A pilot transmission unit and an antenna port partition unit may not be identical. For example, in a state of configuring one 8tx CSI-RS resource, the UE may configure feedback information of two 4tx partitions. In addition, an antenna port partition unit and a feedback unit may not be identical. In particular, in case of aligned partitioned precoding, common PPI feedback information may be fed back with respect to the partitions, to which the same precoding is applied, and thus one feedback unit may be configured with respect to a plurality of partitions.

Figure 20:
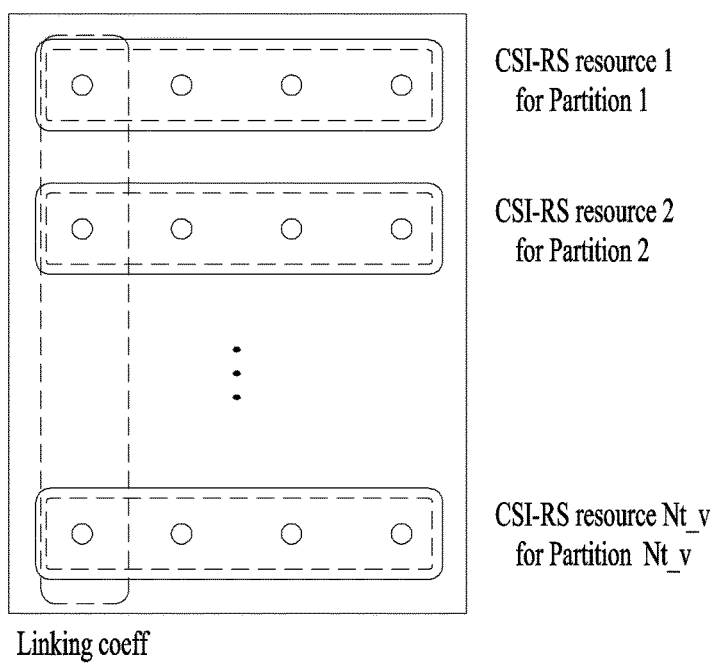
FIGS. 20 to 22 illustrate pilot pattern allocation methods.
Figure 21:
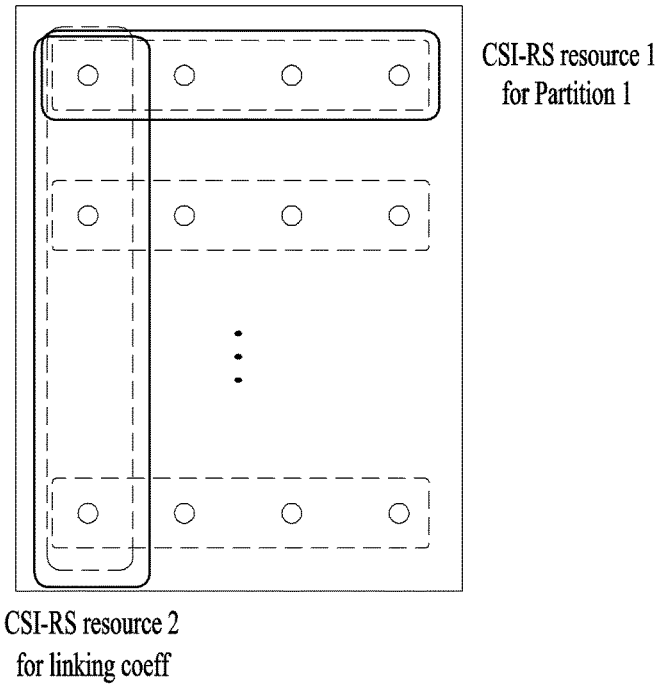
Figure 22:
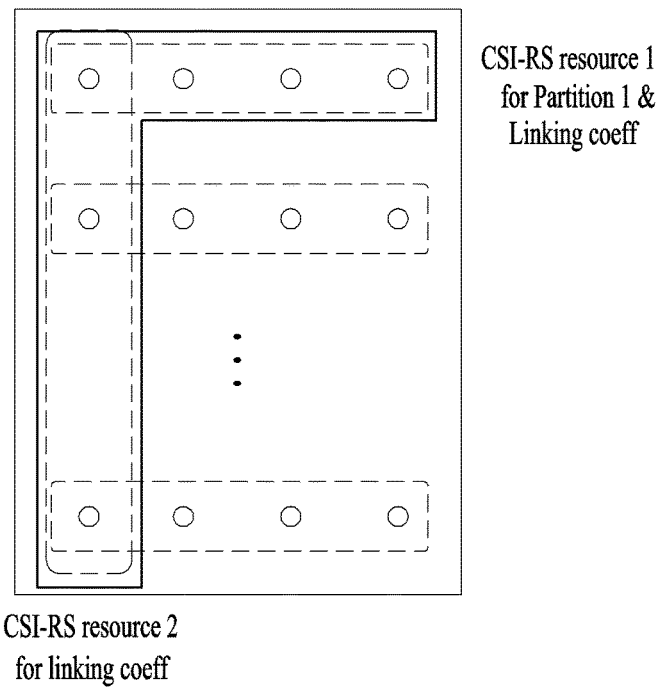

B. Not Aligned Unit of Partition, Pilot Pattern & PMI Feedback 1. (Partition) It is assumed that antenna port partitioning is equal to that of FIG. 18.
2. (PMI feedback) Feedback information is composed of a PPI, which is commonly applicable to all partitions (hereinafter, common PPI) in consideration of perfectly aligned partitioned precoding, and linking coefficient values. In this case, the partition unit and the feedback unit may be regarded as different.
3. (Pilot pattern) Various pilot pattern allocation methods may be used. FIGS. 20 to 22 show pilot pattern allocation methods. More specifically, as shown in FIG. 20, a separate pilot resource may be configured per partition. As shown in FIG. 21, one pilot pattern may be transmitted via a first partition such that the UE calculates a common PPI and one pilot pattern may be transmitted to antenna ports, to which the linking precoder is applied, such that the UE calculates linking coefficient values. Alternatively, as shown in FIG. 22, only one pilot pattern may be configured such that the UE simultaneously calculates the common PPI and the linking coefficients.

<CSI Calculation for Fractional Beamforming>

Hereinafter, a CSI calculation method and a CSI feedback information configuration method of a UE for fractional beamforming will be described. First, as a channel state information (CSI) calculation method of a UE in a system to which fractional beamforming is applied, the UE assumes that one of default precoding, reference precoding and random precoding is applied to a part corresponding to a non-control space among antenna port partitions and linking coefficients upon estimating or calculating some CSI.

Some CSI includes not only PMI but also CQI and RI. In addition, in case of random precoding, since the UE does not know the precoding scheme applied to the non-control space by the eNB, the UE arbitrarily assumes the precoding scheme applied to the non-control space by the eNB and calculates the CSI.

The method of assuming the precoding scheme applied to the non-control method and then calculating the CSI at the UE may be variously defined as the following (1) to (3).

(1) First, the UE may configure a limited number N of precoder candidates with respect to the non-control space and obtains $CQI_1, \ldots, CQI_N$ upon applying the candidates. Thereafter, the UE reports an average value of CQI values of all precoder candidates for the non-control space, that is, $CQI_1=(CQI_1+ \ldots +CQI_N)/N$.

(2) The UE may configure a limited number N of precoder candidates with respect to the non-control space and obtains $CQI_1, \ldots, CQI_N$ upon applying the candidates. Hereafter, the UE reports worst case CQI of all precoder candidates for the non-control space, that is, CQI=minimum of $\{CQI_1, \ldots, CQI_N\}$.

(3) The UE may randomly generate and configure a precoder with respect to the non-control space and obtain and feed back CQI upon applying the precoder to the eNB.

When the above-described CQI calculation method is extended/applied to partial dimensional beamforming technology in a 3D beamforming environment, the UE may apply one of default precoding, reference precoding and random precoding to one of a vertical precoder or a horizontal precoder upon estimating or calculating some CSI.

Although the partition and the CSI feedback are linked in the above description, the relationship between the pilot and the CSI feedback may be different from the relationship between the partition and the CSI feedback. Accordingly, the UE may assume that one of default precoding, reference precoding and random precoding is applied to a part corresponding to the non-control space among a plurality of co-located antenna port patterns and values for linking the co-located antenna port patterns upon estimating or calculating some CSI. The antenna port pattern includes an NZP CSI-RS resource and a CSI-RS pattern. This will be described in the following (A) to (D) in detail.

(A) In the example of FIG. 20, when the linking precoder (or the vertical precoder) belongs to the non-control space, the eNB configures a plurality of (co-located) pilot patterns to the UE and the UE assumes that a value for linking PMI(s) to be applied to the MIMO channel corresponding to each pilot pattern in order to calculate CSI is a value defined in the system, a value designated by the eNB or a randomly generated value, and calculates CSI.

(B) In the example of FIG. 20, when the sub-precoder (horizontal precoder) belongs to the non-control space, the eNB configures a plurality of (co-located) pilot patterns to the UE and the UE assumes that a precoder value to be applied to some or all of pilot patterns in order to calculate CSI is a value defined in the system, a value designated by the eNB or a randomly generated value, and calculates CSI.

(C) In the example of FIG. 21, when the linking precoder (or the vertical precoder) belongs to the non-control space, the eNB configures a plurality of (co-located) pilot patterns to the UE and the UE assumes that a precoder value to be applied to the MIMO channel corresponding to each pilot pattern in order to calculate CSI is a value defined in the system, a value designated by the eNB or a randomly generated value, and calculates CSI.

(D) In the example of FIG. 22, the eNB configures one pilot pattern to the UE and the UE assumes that a precoder value to be applied to the MIMO channel corresponding to some of the antenna ports belonging to the pilot pattern configured in order to calculate CSI is a value defined in the system, a value designated by the eNB or a randomly generated value and calculates CSI.

<CSI Content for Fractional Beamforming>

Implicit feedback information for fractional beamforming may include preferred PMI or coefficient values of the UE for some partitions and/or linking precoders. In consideration of a relationship between a pilot (pattern) and PMI feedback, when the UE configures preferred precoding indication (PPI) feedback information, only some PPI corresponding to the control space among a plurality of (co-located) antenna port patterns and values for linking the (co-located) antenna patterns may be included as CSI content.

At this time, since the plurality of (co-located) antenna port patterns belongs to the same transmission point, commonly applicable CQI and RI are efficiently fed back to the eNB. Accordingly, when the UE configures the feedback information, some PPI corresponding to the control space and CQI and RI for all (co-located) antenna port patterns among the plurality of (co-located) antenna port patterns and the values for linking the (co-located) antenna port patterns may be included as CSI content. More specifically, CSI content may be configured using the following methods (a) to (c).

(a) First, the eNB configures N (co-located) pilot patterns CSI-RS #0, . . . , N−1 to the UE and the UE transmits PMIs for M (M<N) pilot patterns of the N configured pilot patterns, one CQI for all antennas and one RI for all antennas. Additionally, the PMI for the linking precoder may be fed back. In this case, in a fourth embodiment, the UE may apply a CSI calculation method to a CSI-RS pattern in which PMI reporting is not performed, such that the UE calculates PMI, CQI and RI.

(b) If the CSI-RS transmission method in the 3D beamforming environment of FIG. 21 is considered, the eNB may first configure two (co-located) CSI-RS patterns with respect to the UE and the UE may transmit PMI for one of the two configured CSI-RS patterns, one CSI for aggregated CSI-RS resources of the two CSI-RS patterns and one RI for aggregated CSI-RS resources to the eNB. In this case, since the first antenna ports of the two CSI-RS patterns are transmitted at the same physical antenna, the UE may not transmit the PPI for the linking precoder.

(c) If a single pilot pattern configuration method shown in FIG. 22 is considered, the eNB may configure one CSI-RS pattern to the UE and the UE may transmit PMI for some of the antenna ports belonging to the configured CSI-RS pattern, one CQI for all antenna ports and one RI for all antenna ports to the eNB.

Although it is assumed that one CQI for all transmission layers is fed back in (a) to (c), the present invention is not limited thereto. For example, when the same modulation and coding scheme is defined as being applied upon transmitting a plurality of layers as in an LTE system, CQI may be fed back in codeword units. In this case, "one CQI" may be modified to "one CQI per codeword".

In addition, for fractional beamforming, as CSI information or separate feedback, information on channel movement of the UE is necessary. Such information may include statistical data (e.g., LoS parameter, path-loss, correlation, etc.) and mobility information (movement direction, speed, acceleration, Doppler spread, etc.) of the channel.

In particular, the movement direction may be an absolute direction (e.g., change in position relative to a specific reference position) or a relative direction (e.g., change in position of the UE relative to the position of a reference eNB). Here, the position of the reference eNB may be the position of a serving eNB (point), or the position of a predetermined eNB or specific coordinates indicated by the eNB via signaling. Further, the relative direction may be measured based on a specific signal such as a positioning reference signal of eNB(s) or a specific message including relative distance information or response delay information.

Additionally, in the above-described embodiments, one PMI may not be expressed by only one index. For example, in an LTE system, when the eNB transmits using a total of eight transmit antenna ports, the UE feeds back two PMIs. Accordingly, if one pilot pattern is composed of eight or more transmit antenna ports, two or more indices may be used to indicate the preferred index for each pilot pattern.

<Network Controlled Flexible Fractional Beamforming>

In order for the eNB to apply the fractional beamforming method or the partitioned beamforming method, the eNB may provide control information A) to D) to the UE and the UE may configure and report feedback information using such information.

A) Antenna port partitioning information includes the size of each partition and the number of partitions or the form factor of each partition. Here, the form factor indicates the physical properties of antenna ports belonging to each partition and includes polarization property, transmit power, radiation pattern, the number of physical antennas configuring one antenna port and property information. In particular, the antenna port partition may be may be defined as a basic feedback unit of the UE.

B) Antenna port partition to pilot pattern mapping. This indicates information explicitly or implicitly indicating a relation between the antenna port partition and the pilot pattern as shown in FIGS. 20 to 22.

C) Reference antenna port or pilot pattern for linking coefficient. This indicates information indicating the reference antenna port or pilot pattern used to measure the relative phase and magnitude when the UE measures the linking coefficient.

D) Co-location information of pilot patterns or antenna partitions. This indicates information indicating to the UE whether or not the pilot patterns (or antenna partitions) are transmitted from the same position, that is, the same node, when a plurality of pilot patterns or antenna partitions is configured with respect to the UE.

The information of A) to D) may be delivered to the UE via a physical layer message or a higher layer message and the properties thereof (e.g., signaling method, signaling period, signaling resource, channel, etc.) may vary according to information. In addition, the eNB/UE may be expressed by a transmitter/receiver. That is, when an arbitrary transmitter performs fractional beamforming, the transmitter may provide some information to the receiver.

Detailed examples will be described. As shown in FIGS. 21 and 22, in an LTE system, if each antenna port partition is mapped to one NZP CSI-RS resource, the eNB may assign a plurality of NZP CSI-RS resources to the UE with respect to a plurality of co-located antenna port partitions belonging to one node to provide information on the antenna port partition. At this time, the eNB may notify the UE of information on co-location between NZP CSI-RS resources to indicate whether different NZP CSI-RS resources are transmitted from the same node. That is, a QCL condition between the plurality of CSI-RS resources may be newly defined and then signaled to the UE. In this case, the UE may assume that QCL CSI-RS resources are transmitted from the same node and non-QCL CSI-RS resources are transmitted from different nodes.

Meanwhile, fractional beamforming may optimize feedback overhead according to the channel state between the transmitter and the receiver and decrease a transmission error probability. When fractional beamforming is applied to downlink transmission, a channel condition between an eNB and a UE may vary according to UEs. For example, a UE A in the same eNB may be in a low Doppler channel state, a UE B may be in a high Doppler channel state, and a UE C may be restrictively in a low Doppler channel state in some partitions. Accordingly, whether fractional beamforming is applied and a control space and a non-control space configured upon applying fractional beamforming may vary according to UEs. In addition, whether fractional beamforming is applied and a control space and a non-control space configured upon applying fractional beamforming may adaptively change according to UE movement or change in peripheral environment.

Accordingly, the eNB shall provide the UE with information on fractional beamforming activation, information on a fractional beamforming mode and information on a precoding scheme applied to the non-control space.

1) Here, the information on fractional beamforming activation means information directly or indirectly indicating whether fractional beamforming is applied and may be implemented in the form of a message indicating fractional beamforming activation or in the form of setting one of a transmission mode supporting fractional beamforming or a transmission mode not supporting fractional beamforming.

2) Next, the information on the fractional beamforming mode indicates information directly or indirectly indicating the control space and the non-control space configured upon fractional beamforming.

For example, this may be implemented in the form of CSI configuration for each antenna partition (or each pilot pattern). This means information as to which CSI information is necessary for each antenna port partition or pilot pattern, for example, information as to whether PMI reporting is necessary for each pilot pattern (more specifically, CSI-RS pattern). That is, if PMI feedback is necessary, this means information indicating the closed-loop pilot pattern corresponding to the control space or the open-loop pilot pattern corresponding to the non-control space.

Alternatively, the information on the fractional beamforming mode may be implemented in the form of a linking coefficient feedback configuration or linking PMI feedback configuration for each (co-located) pilot pattern (or antenna port). This means necessity of linking coefficient feedback and/or information on pilot pattern or antenna partition requiring linking coefficient feedback. According to the pilot patterns to the antenna partition mapping, even when the pilots do not correspond to the non-control space, the linking PMI feedback may not be necessary. That is, if the pilot pattern is mapped as shown in FIG. 21, when the pilots do correspond to the non-control space but the first pilot of each pilot pattern is transmitted via the same physical antenna, the linking coefficient information feedback may not be necessary.

Alternatively, the information on the fractional beamforming mode may be implemented in the form of a linking coefficient feedback configuration or a linking PMI feedback configuration for all (co-located) pilot patterns (or antenna ports). This may define a set of information to be fed back for all (co-located) antenna ports or pilot patterns. For example, when two CSI-RS patterns P1 and P2 are configured with respect to the UE, the network may define a mode for reporting aggregated CQI/RI (open-loop beamforming) as mode 1, a mode for reporting PMI for P1 and aggregated CQI/RI as mode 2 (fractional beamforming mode 1) and a mode for reporting PMI for P2 and aggregated CQI/RI as mode 3 (fractional beamforming mode 2). Additionally, a mode for reporting PMI for linking coefficients and aggregated CQI/RI is defined as mode 4 (fractional beamforming mode 3). Further, PMI for P1, PMI for P2, PMI for linking coefficients and aggregated CQI/RI may be defined as mode 5 (closed-loop beamforming) Here, the aggregated CQI/RI means a CQI/RI value for all co-located antenna ports.

Alternatively, information on the fractional beamforming mode may be implemented in the form of information on a control space indicator for each (co-located) pilot pattern (or antenna port). This means a message explicitly indicating a control/non-control space for each antenna partition or pilot pattern and may be defined by an indicator having a size of 1 bit for each CSI-RS pattern. For example, if the logic value of the indicator is 0, the CSI-RS pattern belongs to the control space and, if the logic value of the indicator is 1, the CSI-RS pattern belongs to the non-control space.

Alternatively, the information on the fractional beamforming mode may be implemented in the form of information on the control space indicator for linking coefficients or linking PMI of (co-located) pilot patterns (or antenna ports). This is a message indicating whether the linking coefficient for linking the pilot patterns or antenna partitions corresponds to the control space, and information on a reference antenna port or reference pilot pattern necessary to measure each linking coefficient may be further provided. Similarly, such information may be defined by an indicator having a size of 1 bit for each CSI-RS pattern. No linking coefficient is needed for the CSI-RS pattern when the logic value of the indicator is 0 and the linking coefficient is needed for the CSI-RS when the logic value of the indicator is 1. Here, the reference antenna or the reference pilot pattern refers to all information indicating the reference antenna port or pilot pattern used to measure the relative phase and magnitude when the UE measures the linking coefficient.

3) Lastly, the information on the precoding scheme applied to the non-control space may include a precoding scheme indicator for each pilot pattern or antenna partition such as PMI. In particular, a null value may be transmitted in the precoding scheme information for some pilot patterns or antenna partitions to indicate that the pilot pattern corresponds to the control space.

Alternatively, the information on the precoding scheme applied to the non-control space may include information on the precoding type for each pilot pattern or antenna partition, such as transmit diversity, cyclic delay diversity (CDD), random precoding (precoder cycling). Similarly, a null value may be transmitted in the precoding type information for some pilot patterns or antenna partitions to indicate that the pilot pattern corresponds to the control space.

Alternatively, the information on the precoding scheme applied to the non-control space may include information on the precoding scheme or precoding type for all antenna partitions (or pilot patterns). This is a message indicating the precoding scheme or precoding type to be commonly applied to all antenna partitions or all pilot patterns belonging to the non-control space. In this case, the non-control space information or indicator of 2) may be further needed.

Alternatively, the information on the precoding scheme applied to the non-control space may be expressed by the information on the linking coefficient for linking a plurality of antenna partitions (or pilot patterns). That is, the UE indicates a coefficient value to be used when linking specific antenna partitions or pilot patterns.

In summary, the eNB notifies the UE of 1) whether fractional beamforming is applied and/or 2) information indicating which sub-precoder and/or linking precoder belongs to the control space and the non-control space upon fractional beamforming and/or 3) information on which precoding type or precoding scheme is applied to the sub-precoder and/or the linking precoder corresponding to the non-control space.

Meanwhile, the information 1) and the information 2) may be signaled together. For example, as in the information 2), which beamforming mode is supported by the transmitted feedback information may be specified.

In an LTE system, as the implementations of the information 1) and/or the information 2), a new transmission mode supporting fractional beamforming may be defined. Fractional beamforming modes may be defined as separate transmission modes and may be defined to have different parameter values within the same transmission mode. At this time, information as to whether fractional beamforming is enabled/disabled or used fractional beamforming mode information may be signaled via a higher layer message or a physical layer message. Information as to whether fractional beamforming is enabled or disabled or fractional beamforming mode information may be explicitly or implicitly signaled to the UE. An explicit signaling method may include a method of defining a fractional beamforming mode number of index and delivering the fractional beamforming mode index to the UE via a higher layer message or a physical layer message. An implicit signaling method may include a method of mapping a specific feedback mode to information as to whether fractional beamforming is enabled or disabled or each fractional beamforming mode and then signaling information as to whether fractional beamforming is enabled/disabled to the UE in a manner of configuring a specific feedback mode.

Hereinafter, feedback methods according to embodiments of the present invention for more flexibly applying fractional beamforming will be described.

First Embodiment

First, the UE feeds the following information back to the eNB. In the first embodiment, the UE provides necessary information such that the eNB appropriately changes and applies the fractional beamforming mode.

1) Preferred precoding indication for each antenna port partition or each pilot pattern
2) PPI for the linking precoder or linking coefficient value
3) CQI for each candidate beamforming mode
4) RI for each candidate beamforming mode Here, the PPI for the linking precoder or linking coefficient value may be omitted when the PPI for each antenna port partition or pilot pattern is not normalized.

In particular, the candidate beamforming mode may include fractional beamforming methods having different control spaces/non-control spaces, a closed-loop beamforming method in which all partitions correspond to the control space, and an open-loop beamforming method in which all partitions correspond to the non-control space. The candidate beamforming mode may be configured via the higher layer message per node or cell, may be configured via the higher layer message per UE, or may be defined by the network according to the antenna port configuration or the pilot configuration.

The information fed back by the UE, that is, the information 1) and/or the information 2), may be restricted according to the candidate beamforming mode. For example, in a certain transmission mode of a plurality of candidate beamforming modes, PPI feedback may be omitted with respect to the antenna port partition or the pilot pattern which is not included in the control space. In addition, the candidate beamforming mode may be implicitly signaled in the form of indication information of the antenna port partition or pilot pattern requiring the PPI feedback and the linking coefficient. Of course, the PPI may be applied in the form of PMI.

If a large number of transmission modes is included in the candidate beamforming mode, the amount of feedback information may significantly increase. In order to solve such a problem, the following methods may be considered.

a) Feedback of a difference between PPI/CQI/RI and a predetermined reference PPI/CQI/RI may be considered in the feedback of the PPI, CQI and/or the RI.

b) On the assumption that common PI is applied to some or all antenna port partitions or pilot patterns, the common RI information is fed back.

Here, a) refers to a method of feeding back PPI, CQI or RI of a specific antenna port partition, pilot pattern or beamforming mode and feeding back differences between PPI, CQI or RI values of the other antenna port partitions, pilot patterns or beamforming modes and the fed-back PPI, CQI or RI to decrease feedback amount or increase feedback accuracy. In addition, b) refers to a method of forcibly applying a common RI value to some or all antenna port partitions, pilot patterns or beamforming modes to decrease RI feedback overhead.

In a 3D MIMO environment, when perfectly aligned partitioned precoding is performed and the first embodiment of the present invention is applied, the following information set may be fed back.

(1) PMI to be applied to the aligned antenna port partition
   (2) linking coefficient or linking PMI
   (3) at least two of CQI #x (x=1, . . . , 4)
   (4) at least two of RI #x (x=1, . . . , 4)

In (3) and (4), x means a beamforming mode index. For example, beamforming #1: closed-loop beamforming, beamforming mode #2: open-loop beamforming, beamforming mode #3: fractional beamforming mode #1 and beamforming mode #4: fractional beamforming mode #2 may be configured. In particular, fractional beamforming mode #1 corresponds to a transmission mode in which the aligned antenna port partition corresponds to the control space and the linking coefficient corresponds to the non-control space and fractional beamforming mode #2 corresponds to a transmission mode in which the aligned antenna port partition corresponds to the non-control space and the linking coefficient corresponds to the control space. In a 3D beamforming environment, fractional beamforming mode #1 is applicable as a vertical beamforming mode and fractional beamforming mode #2 is applicable as a horizontal beamforming mode.

In addition, the above-described CSI calculation method is applicable to the fractional beamforming mode of CQI #x and RI #x. More specifically, the number of CQI/RI values may be restricted to 3 or less by the candidate beamforming mode configuration. In particular, only one RI value applied commonly may be fed back.

If the pilot configuration is applied as shown in FIG. 20, the information (1) and (2) may be changed to (1) PMI to be commonly applied to a pilot pattern in which QCL assumption is possible and (2) the linking coefficient or linking PMI for linking the PMI for a pilot pattern in which QCL assumption is possible.

If the pilot configuration is applied as shown in FIG. 21, the information (1) and (2) may be changed to (1) the PMI for one of pilot patterns in which QCL assumption is possible and (2) the PMI for another pattern of the pilot patterns in which QCL assumption is possible.

Figure 23:
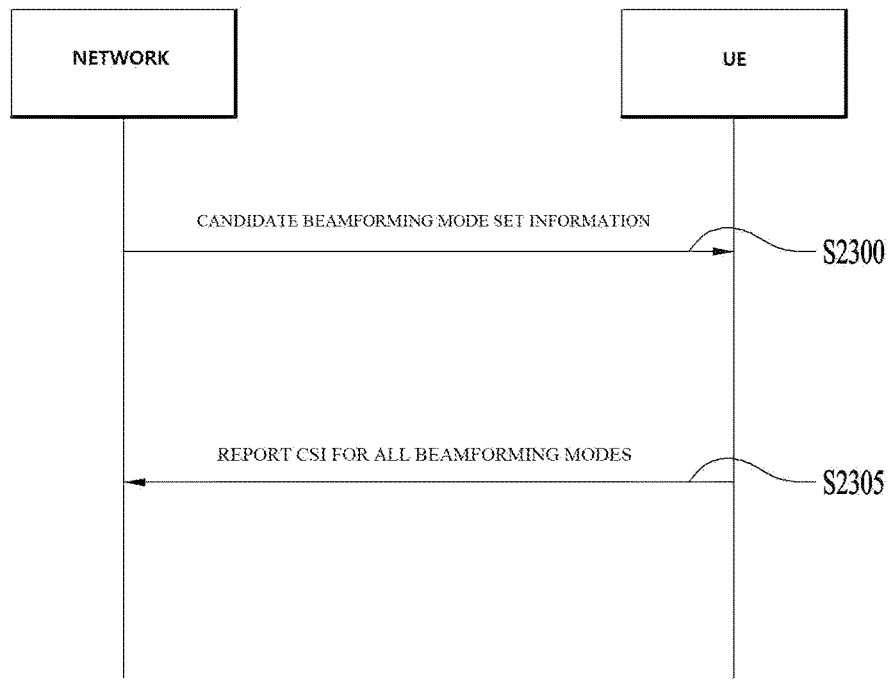
FIG. 23 is a diagram showing an information exchange process between a network and a UE according to a first embodiment of the present invention.

FIG. 23 is a diagram showing an information exchange process between a network and a UE according to a first embodiment of the present invention.

Referring to FIG. 23, in step 2300, the network signals information on a candidate beamforming mode set configuration to the UE. The UE, which has received the information, configures and reports CSI information supporting all beamforming modes included in the candidate beamforming mode set to the network in step 2305 according to the first embodiment of the present invention.

Step 2300 may be omitted when the candidate beamforming mode set is predetermined or when all beamforming modes are configured to be included in the candidate beamforming mode set.

Second Embodiment

Separately from or in conjunction with the first embodiment, the UE may determine the channel state and adaptively configure feedback. That is, the UE may determine one or more suitable beamforming modes via estimation of the channel between the eNB and the UE and configure feedback information. More specifically, in the second embodiment of the present invention, the UE may feed back the following information. In particular, the second embodiment of the present invention relates to a method of selecting one or more beamforming modes preferred by a UE (a combination of a control space and a non-control space preferred by the UE) and then feeding back PPI/CQI/RI.

1) Beamforming mode information selected by the UE (among the candidate beamforming modes)
   2) CQI and RI for the beamforming mode selected by the UE (among the candidate modes)
   3) PPI for the antenna port partition or pilot pattern corresponding to the control space in the beamforming mode selected by the UE (among the candidate modes)

As in 2) and 3), the method of configuring the feedback for the plurality of beamforming modes at the UE is equal to the method of configuring the feedback for the plurality of candidate beamforming modes in the first embodiment. That is, while the eNB or network configures the candidate beamforming mode in the first embodiment, the UE selects the beamforming mode in the second embodiment.

In addition, the beamforming mode information selected by the UE of 1) may be explicitly or implicitly signaled. For example, while reporting the information of 3), the information of 1) may be fed back using a method of transmitting the antenna port partition index or the pilot pattern index (e.g., NZP CSI-RS index, CSI process index, etc.) corresponding to the PPI transmitted by the UE together.

In addition, upon applying the second embodiment, a process of, at the network, configuring a candidate beamforming mode set with respect to the UE may be added. In this case, the UE may select one or more of the beamforming modes belonging to the candidate beamforming mode set and feed back PPI/CQI/RI supporting the beamforming mode.

Figure 24:
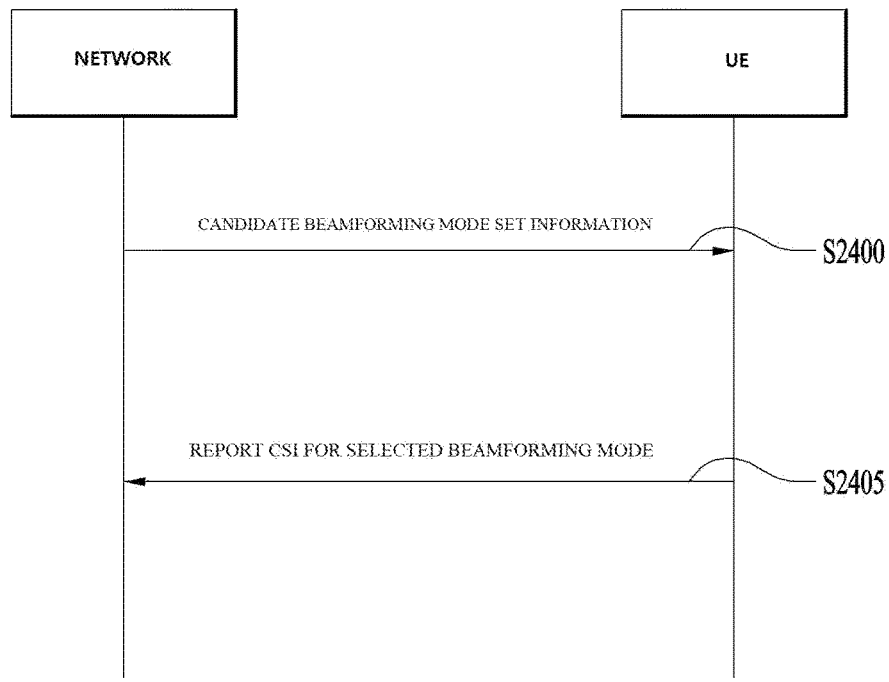
FIG. 24 is a diagram showing an information exchange process between a network and a UE according to a second embodiment of the present invention.

FIG. 24 is a diagram showing an information exchange process between a network and a UE according to a second embodiment of the present invention.

Referring to FIG. 24, in step 2400, the network signals information for configuring a candidate beamforming mode set to the UE. The UE, which has received the information, and configures and reports CSI information supporting one beamforming mode selected from among the beamforming modes included in the candidate beamforming mode set to the network according to the second embodiment of the present invention.

Step 2400 may be omitted when the candidate beamforming mode set is predetermined or when all beamforming modes are configured to be included in the candidate beamforming mode set.

Figure 25:
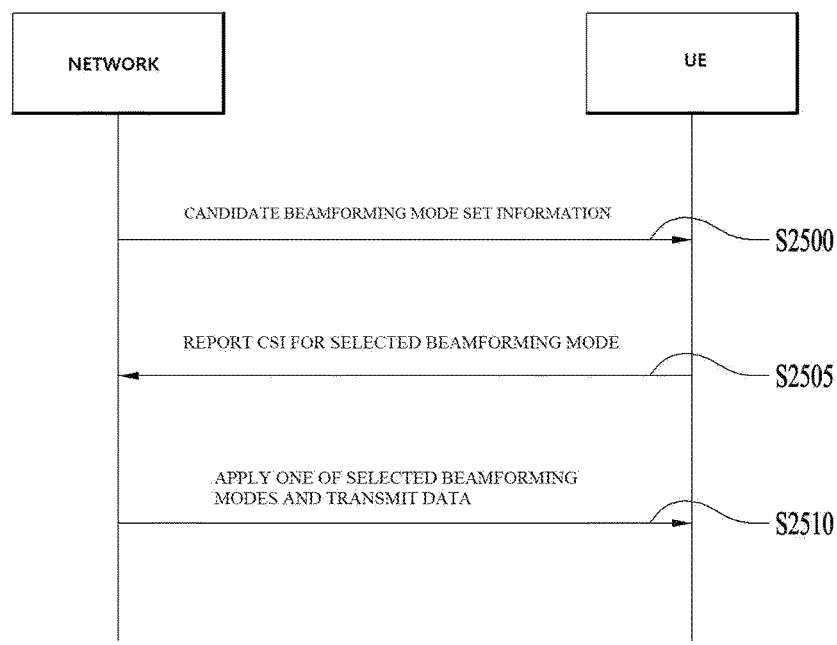
FIG. 25 is a diagram showing a process of configuring feedback for a plurality of beamforming modes at a UE according to the second embodiment of the present invention.

FIG. 25 is a diagram showing a process of configuring feedback for a plurality of beamforming modes at a UE according to the second embodiment.

Referring to FIG. 25, in step 2500, the network signals information for configuring a candidate beamforming mode set to the UE. The UE, which has received the information, selects two or more beamforming modes from among the beamforming modes included in the candidate beamforming mode set and configures and reports CSI information supporting the beamforming modes to the network. The network, which has received the information, selects and applies one of the plurality of beamforming modes selected by the UE and transmits a data signal in step 2510.

Similarly, step 2500 may be omitted when the candidate beamforming mode set is predetermined or when all beamforming modes are configured to be included in the candidate beamforming mode set.

Although one CQI is fed back with respect to all transmission layers in the present invention, the present invention is not limited thereto. For example, as in an LTE system, CQI may be fed back in units of a codeword which is a group to which the same MCS level is applied upon transmitting a plurality of layers. In this case, the CQI described in the embodiment of the present invention is applicable as "one CQI per codeword".

Further, the PPI or PMI may not be expressed by only one index. For example, in the LTE system, when an eNB transmits a signal via a total of eight antenna ports, a UE may feed back two PMIs. Accordingly, if one pilot pattern is composed of eight or more antenna ports, two or more PMIs may be used to indicate the preferred index of the pilot pattern.

In addition, if the feedback information proposed by the present invention is applied to a broadband system, a separate feedback information set may be fed back in a specific frequency region (e.g., subband, subcarrier, resource block, etc.). Alternatively, feedback information may be transmitted in a specific frequency region selected by the UE or designated by the eNB. The frequency region may be composed of one or more frequency-continuous regions or frequency-discontinuous regions.

Figure 26:
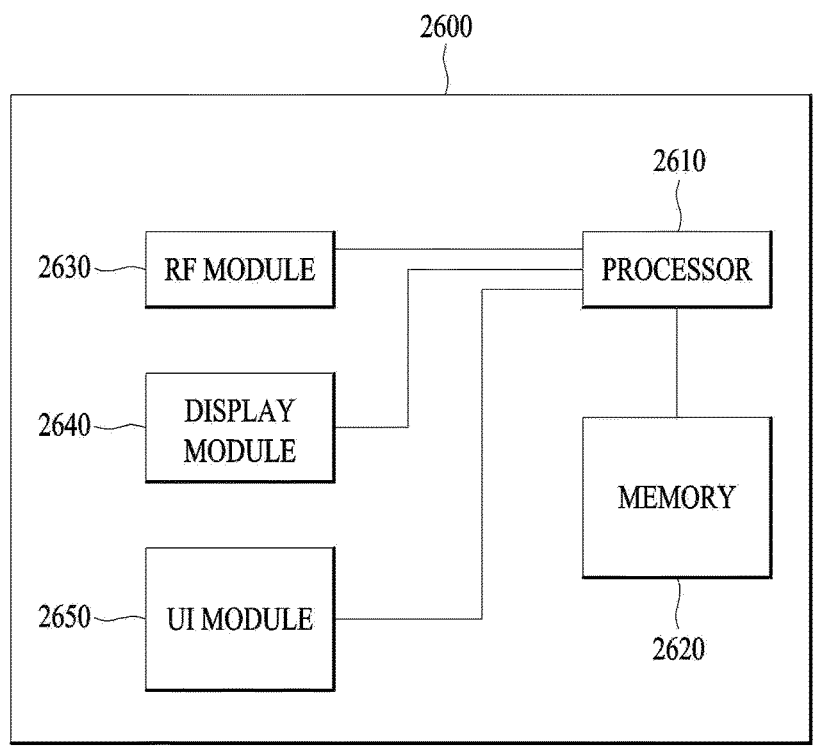
FIG. 26 is a block diagram of a communication apparatus according to an embodiment of the present invention.

FIG. 26 is a block diagram of a communication apparatus according to an embodiment of the present invention.

Referring to FIG. 26, a communication apparatus 2600 includes a processor 2610, a memory 2620, an RF module 2630, a display module 2640, and a User Interface (UI) module 2650.

The communication device 2600 is shown as having the configuration illustrated in FIG. 26, for the convenience of description. Some modules may be added to or omitted from the communication apparatus 2600. In addition, a module of the communication apparatus 2600 may be divided into more modules. The processor 2610 is configured to perform operations according to the embodiments of the present invention described before with reference to the drawings. Specifically, for detailed operations of the processor 2610, the descriptions of FIGS. 1 to 25 may be referred to.

The memory 2620 is connected to the processor 2610 and stores an Operating System (OS), applications, program codes, data, etc. The RF module 2630, which is connected to the processor 2610, upconverts a baseband signal to an RF signal or downconverts an RF signal to a baseband signal. For this purpose, the RF module 2630 performs digital-to-analog conversion, amplification, filtering, and frequency upconversion or performs these processes reversely. The display module 2640 is connected to the processor 2610 and displays various types of information. The display module 2640 may be configured as, not limited to, a known component such as a Liquid Crystal Display (LCD), a Light Emitting Diode (LED) display, and an Organic Light Emitting Diode (OLED) display. The UI module 2650 is connected to the processor 2610 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although an example in which a method and apparatus for transmitting feedback information at a UE for fractional beamforming in a wireless communication system is applied to a 3GPP LTE system is described, the present invention is applicable to various wireless communication systems in addition to the 3GPP LTE system.

What is claimed is:

1. A method of transmitting feedback information from a user equipment (UE) to a network for fractional beamforming based on multiples antennas in a wireless communication system, the method comprising:
receiving, by the UE, reference signals corresponding to antenna partitions included in the multiple antennas and information on the beamforming modes included in a candidate beamforming mode set from the network;
selecting, by the UE, two or more beamforming modes among beamforming modes included in the candidate beamforming mode set and configuring the feedback information related to the selected two or more beamforming modes, based on the reference signals; and
transmitting, by the UE, the feedback information to the network,
wherein the feedback information includes a precoding matrix index corresponding to at least one of the antenna partitions and linking coefficient information for linking the antenna partitions,
wherein the feedback information further includes channel quality information (CQI) of one beamforming mode among the selected two or more beamforming modes and a difference value between the CQI and a CQI of other beamforming mode among the selected two or more beamforming modes.

2. The method according to claim 1, wherein the feedback information includes rank indicators of the beamforming modes included in the candidate beamforming mode set.

3. The method according to claim 1, wherein, when the antenna partitions are in a perfectly aligned state, the feedback information includes one precoding matrix for the antenna partitions and the linking coefficient information.

4. The method according to claim 1, further comprising, receiving a signal based on one of the selected two or more beamforming modes selected and applied by the network.

5. The method according to claim 1, wherein the candidate beamforming mode set includes at least one of an open-loop beamforming mode, a closed-loop beamforming mode, a vertical beamforming mode and a horizontal beamforming mode.

6. A method of, at a network, receiving feedback information from a user equipment (UE) for fractional beamforming based on multiple antennas in a wireless communication system, the method comprising:
transmitting reference signals corresponding to antenna partitions included in the multiple antennas and information on the beamforming modes included in a candidate beamforming mode set to the UE; and
receiving the feedback information based on the reference signals from the UE,
wherein the feedback information relates to one or more beamforming modes selected by the UE among the beamforming modes included in the candidate beamforming mode set and includes a precoding matrix index corresponding to at least one of the antenna partitions and linking coefficient information for linking the antenna partitions,
wherein the feedback information further includes channel quality information (CQI) of one beamforming mode among the selected one or more beamforming modes, a difference value between the CQI and a CQI of other beamforming mode among the selected one or more beamforming modes.

7. The method according to claim 6, wherein the feedback information includes rank indicators of the beamforming modes included in the candidate beamforming mode set.

8. The method according to claim 6, wherein, when the antenna partitions are in a perfectly aligned state, the feedback information includes one precoding matrix for the antenna partitions and the linking coefficient information.

9. The method according to claim 6, further comprising, selecting and applying one of the selected two or more of beamforming modes and transmitting a signal to the UE.

10. The method according to claim 6, wherein the candidate beamforming mode set includes at least one of an open-loop beamforming mode, a closed-loop beamforming mode, a vertical beamforming mode and a horizontal beamforming mode.

* * * * *